US012773827B2

(12) United States Patent
Denton et al.

(10) Patent No.: US 12,773,827 B2

(45) Date of Patent: Oct. 27, 2026

(54) SYSTEMS AND METHODS FOR FORMING POLYMER MASONRY UNITS

(71) Applicant: Lithic Industries Holding Co, Temple, TX (US)

(72) Inventors: Todd Denton, Temple, TX (US); Michael Doty, Academy, TX (US); Griffith J. Williams, Star, ID (US); Samuel Lopez, Abilene, TX (US); Kameron Anthony Hill, Brazoria, TX (US); Johnathan Ross, Abilene, TX (US); Dyllon Hagan, Fort Worth, TX (US); Timothy James Kennedy, Abilene, TX (US); Mac Steele, Statesville, NC (US)

(73) Assignee: Lithic Industries Holding Co.

( * ) Notice: Subject to any disclaimer, the term of this patent is extended or adjusted under 35 U.S.C. 154(b) by 99 days.

(21) Appl. No.: 18/421,004

(22) Filed: Jan. 24, 2024

(65) Prior Publication Data

US 2024/0166564 A1 May 23, 2024

Related U.S. Application Data

(63) Continuation-in-part of application No. 17/409,952, filed on Aug. 24, 2021, now Pat. No. 12,103,894.

(Continued)

(51) Int. Cl.

*B29C 67/24* (2006.01)
*B28B 3/20* (2006.01)

(Continued)

(52) U.S. Cl.

CPC .............. *B29C 67/242* (2013.01); *B28B 3/20* (2013.01); *B28B 11/16* (2013.01); *C04B 14/28* (2013.01);

(Continued)

(58) Field of Classification Search

CPC ... B29C 48/355; B29C 67/243; B29C 67/242; B29C 67/245; B28B 11/16; B28B 1/30; B28B 5/02; B28B 3/22; B28B 3/20

See application file for complete search history.

(56) References Cited

U.S. PATENT DOCUMENTS 385,317 A * 6/1888 Niedergesaess ........ B29C 48/03 425/97
2,693,016 A * 11/1954 Webb .................... B28B 11/161 239/548

(Continued)

FOREIGN PATENT DOCUMENTS

CN 101781105 A 7/2010
WO 2008128287 A1 10/2008
WO 2019112555 A1 6/2019

OTHER PUBLICATIONS

Barros, Maiccon Martins, et al. "Ecological bricks from dimension stone waste and polyester resin." Construction and Building Materials 232 (Oct. 18, 2019): 117252. (Year: 2019).*

(Continued)

*Primary Examiner* — Benjamin A Schiffman

(74) *Attorney, Agent, or Firm* — Whitaker Chalk Swindle & Schwartz PLLC; Bradley J. Birchfield; Enrique Sanchez, Jr.

(57) ABSTRACT

A polymer masonry unit (PMU) and methods and systems for forming PMUs are presented. In embodiments, a PMU may be made from a PMU mixture of a polymer, a quarry byproduct, such as a limestone aggregate, and water. The PMU may be ambient-dried to become a brick unit. The proportions of the PMU mixture may include 1-10% polymer, 80-90% quarry byproduct, and 1-10% water. The process for making a brick using the PMU of embodiments may avoid a kiln-firing process, which is costly, creates waste, and consumes significant energy. Furthermore, the (Continued)

PMU mixture may be formulated to enable the PMU mixture to be extruded from an extruder, enabling a system for making bricks to take advantage of the extrusion method, which can be very efficient and cost-effective for making bricks, and which is currently not possible with existing techniques and systems.

19 Claims, 15 Drawing Sheets

Related U.S. Application Data

(60) Provisional application No. 63/073,243, filed on Sep. 1, 2020.

(51) Int. Cl.

| | |
|---|---|
| ***B28B 11/16*** | (2006.01) |
| ***C04B 14/28*** | (2006.01) |
| ***C04B 26/04*** | (2006.01) |
| *C04B 111/00* | (2006.01) |

(52) U.S. Cl.
CPC ...... *C04B 26/045* (2013.01); *B28B 2003/203* (2013.01); *C04B 2111/00129* (2013.01)

(56) References Cited

U.S. PATENT DOCUMENTS

| | | | | |
|---|---|---|---|---|
| 5,802,796 | A | 9/1998 | McClinton et al. | |
| 6,264,740 | B1 | 7/2001 | McNulty, Jr. | |
| 6,294,179 | B1 | 9/2001 | Lee et al. | |
| 8,726,594 | B2 * | 5/2014 | Salazar | E04C 2/38 52/309.3 |
| 8,944,803 | B2 * | 2/2015 | Fellabaum | B29C 48/475 425/308 |
| 9,932,489 | B2 * | 4/2018 | Dantin | C04B 26/06 |
| 12,103,894 | B2 * | 10/2024 | Denton | C04B 26/045 |
| 2004/0121082 | A1 | 6/2004 | Dunnous et al. | |
| 2005/0087908 | A1 | 4/2005 | Nasr et al. | |
| 2006/0191232 | A1 | 8/2006 | Salazar et al. | |
| 2013/0210963 | A1 | 8/2013 | Dantin et al. | |
| 2015/0210476 | A1 * | 7/2015 | Ramsdell | B65G 17/065 198/850 |
| 2016/0002867 | A1 | 1/2016 | Hauza | |
| 2024/0417328 | A1 * | 12/2024 | Denton | B28B 1/14 |

OTHER PUBLICATIONS

Beatite 30 Dada Sheet. Onyx Marbres Granules. pp. 1-2 (Year: 2003).

Baghini et al. “Effect of styrene-butadiene copolymer latex on properties and durability of road base stabilized with Portland cement additive” Jun. 29, 2014 Construction and Building Materials pp. 740-749.

Maksimov et al. “Mechanical Properties of Polyester Polymer-Concrete” Mechanics of Composite Material, vol. 35, No. 2, pp. 99-110 (Year: 1999).

Dan et al. “Effects of aggregate type and SBS copolymer on the interfacial heat transport ability of asphalt misture using molecular dynamics simulation” Apr. 2, 2020, Construction and Building Materials, pp. 1-12.

PCT International Patent Appl. No. PCT/US21/71290, international filing date Aug. 26, 2021, International Search Report and Written Opinion, Jan. 6, 2022, 7 pgs.

* cited by examiner

100

SYSTEMS AND METHODS FOR FORMING POLYMER MASONRY UNITS

CROSS-REFERENCE TO RELATED APPLICATIONS

The present application is a continuation-in-part of U.S. patent application Ser. No. 17/409,952, filed on Aug. 24, 2021, which claims priority to U.S. Prov. App. Ser. No. 63/073,243 filed on Sep. 1, 2020, the entireties of which are incorporated herein by reference for all purposes.

TECHNICAL FIELD

The present disclosure generally relates to composite materials, and more specifically to composite material including a rock base material and a polymer.

BACKGROUND

The field of construction has benefitted from advances in technology. For example, construction materials have evolved into various forms and types that are used today. Stone, brick, steel, and concrete are just a few types of the materials that are used in construction. In particular, masonry-related elements (e.g., stone, brick, and concrete) are widely utilized for their comparatively low cost and high compression strength, allowing them to bear heavy loads and form foundations, floors, walls, columns, etc. Different types of masonry-related elements are obtained in different ways. For example, bricks are generally obtained by mixing the ingredients of a brick, molding the mixture into rectangular blocks, and then firing the rectangular blocks to cure them into what is generally referred to as bricks. Concrete is generally a mixture of gravel or sand and cement which can harden when left stationary; and stone is mined, such as at rock quarry locations.

With respect to concrete, the manufacture and use of concrete also engenders a wide range of environmental and social consequences. For example, production of cement, the major component of concrete, is a leading cause of carbon dioxide emissions; the cement industry is one of the three primary producers of carbon dioxide. This is largely due to the need to sinter, e.g., limestone and clay at around 2,700 to 2,800 degrees Fahrenheit—every ton of cement produced releases one ton of carbon dioxide into the atmosphere. Concrete additionally contributes significantly to the urban heat island effect, and production of concrete masonry units also generates other harmful byproduct that can cause health concerns due to toxicity and radioactivity.

With respect to stone, while avoiding many of the issues associated with brick and concrete (i.e., kiln firing, significant carbon emissions from production, etc.), stone must generally be mined from the ground, such as at a rock quarry, and mining stone can be strenuous and wasteful. A rock quarry is a type of open-pit mine in which stone, rock, or aggregate can be excavated from the ground. Many quarry stones such as marble, granite, limestone, and sandstone are cut into larger slabs and removed from the quarry. As slabs are cut from the quarry, waste is produced. The production process for dimensional limestone produces an estimated 38% waste—material that does not meet job size and specifications. This "waste" continues to accumulate daily and represents a sunk cost for the parent company raw material procurement. Quarry byproducts are further produced in crushing and washing operations during processing of crushed stone for use as construction aggregate.

It is estimated that at least 159 million metric tons (175 million tons) of quarry byproducts continue to be generated each year, mostly from crushed stone production operations. As much as 3.6 billion metric tons (4 billion tons) of quarry byproducts have probably accumulated. Currently, the only options for handling byproduct are to continue piling the byproduct into a mountain or crush it for use as crushed aggregate product. While quarry byproduct has historically been utilized by the industry to produce aggregate material, the primary endpoint has been road construction. Specifically, with respect to the fabrication of limestone, such processing creates a fair amount of waste that has very limited application—limestone-based aggregate is typically not hard enough or dense enough to use for roadway base as a stand-alone material. For example, the Texas Department of Transportation (TXDOT) standards require aggregate to be a grade 1 or 2 specification for major thoroughfares, and limestone-based aggregate produced from most Texas limestone generally grades at TXDOT specification 3 or 4, which is too soft for major thoroughfares and generally only acceptable for, e.g., county roads and foundation base.

With respect to bricks, the typical characteristics of bricks (e.g., compression strength and comparatively low cost) makes bricks a very desirable construction material. Bricks are typically made by mixing the basic ingredients together into a mixture. The basic ingredients typically include hydrated lime, feldspar, clay, water, and other organic materials. The mixture is then poured into molds (e.g., rectangular cubic molds) and kiln-fired to make the bricks durable. A kiln is typically used to fire bricks between 1,800 to 2,400 degrees Fahrenheit. In many modern brickworks, bricks are usually burned in a continuously-fired kiln, where the bricks are fired as they move slowly through the kiln on conveyors, rails, or kiln cars, which achieves a more consistent brick product.

However, the current method of making bricks represents a sharp disadvantage that exacerbates environmental problems by adding to carbon emissions or creating structurally inferior products. For example, the current process requires the added expense of kiln fabrication, fuel costs, and additives to accelerate burning. This kiln-firing process cooks the brick into a finished form, which makes it cure and draws out all of the liquid and all of the fluid that might be inside of it to harden the brick. Kiln-firing bricks is costly, as it requires some form of fuel to create the fire that generates the immense heat. Such process requires additional resources, such as natural gas, propane, coal, wood, or other suitable material, which must be purchased, stored, and consumed. Furthermore, this process is susceptible to failures in the power grid, as such failures would results in a production stoppage and a backlog in the brick-making process.

A particular method of forming the bricks may include using an extruder. In this method, the basic ingredient mixture may be pushed through an extruder and the extrusion may be cut into the brick form. This is a very efficient and cost-effective method of making bricks. However, it is well accepted in the industry that, using current techniques, quarry byproducts cannot be extruded into bricks. In particular, limestone-based (e.g., calcium carbonate-based) byproducts are accepted in the industry as being unable to be extruded, as a mixture using a limestone-based and water is not able to be effectively extruded into bricks. As a result, the utility of quarry byproducts in making bricks is greatly minimized by current techniques due to their inability of being extruded.

SUMMARY

The present disclosure achieves technical advantages as a Polymer Masonry Unit (PMU), and as methods and systems for forming PMUs. In embodiments, a PMU may be made from a mixture or slurry that may include a polymer added, in particular proportions, to a quarry byproduct, such as a limestone aggregate, to manufacture a quality brick unit. In embodiments, the proportions of the PMU mixture may include 1-10% polymer, 80-90% quarry byproduct, and 1-10% water. In one embodiment, the present disclosure may avoid a kiln-firing process, which is costly, creates waste, and consumes significant energy. In another embodiment, the present disclosure can avoid the use of cement in forming construction units. In another embodiment, the present disclosure can utilize a mold infusion method that advantageously does not waste those resources or add the expense of those resources and does not create a larger carbon footprint by burning and smoke expulsion.

In embodiments, the PMU mixture may be formulated to enable the PMU mixture to be extruded from an extruder, enabling a system for making bricks to take advantage of the extrusion method, which can be very efficient and cost-effective for making bricks, and which is currently not possible with existing techniques and systems.

The present disclosure solves the technological problem of providing a structurally sound brick or concrete alternative without the need for kiln firing, using traditionally unusable waste material. The present disclosure also solves the technological problem of making bricks using an extrusion method, which is currently not possible with existing techniques and systems. By combining quarry byproduct and a polymer, a polymer masonry unit can be fabricated having compressive strength and architectural utility. In one exemplary embodiment, fiber elements can be added to the byproduct and polymer mixture to increase structural stability. Fiber elements can include hemp, glass, sand, cotton stalks or other plant fibers.

The present disclosure improves the performance of the system itself by providing a basic block or brick unit using an efficient and environmentally responsible manufacturing process that reduces cost and waste. In one embodiment, the manufacturing process includes a polymer/base material that can be poured into molds that cures over a predetermined period, without the need for kiln firing. In one embodiment, the manufacturing process includes a polymer/base material that can be extruded from an extruder and then cut into individual PMUs that cures over a predetermined period, without the need for kiln firing. In another embodiment, by using quarry byproduct to fabricate polymer masonry units, the manufacturing of the polymer masonry unit can be environmentally benign, as quarry byproducts generally do not contain any elements that would be harmful to the environment.

The present disclosure offers significant advantages over traditional concrete and other building unit components. For example, a PMU in accordance with the present disclosure can be fabricated without application of a heat source. In another example, a PMU in accordance with the present disclosure can be fabricated using an extrusion method. In another example, a PMU mixture (e.g., a slurry that can be molded, extruded, and/or dried, such as to make a PMU), can have broad applicability. For example, a PMU mixture can be formed in molds, or extruded and cut, to create face brick replacement blocks, poured as a concrete replacement, roadway material replacement, sculpture base, or other suitable material replacement. In one exemplary embodiment, given the consistency of the mixture, the mixture can be used in 3-D printing applications where this mixture is operably coupled to a computer having a raster or vector file that can control the positioning and operation of a nozzle/aperture device that can deliver precise quantities of the mixture to precise locations. The location of the nozzle/aperture device can be operably coupled to a mechanical positioning system, such as a track and servo motor frame, and controlled by the computer. The mixture can then be cured into the final piece.

In one embodiment, the present disclosure can include a specifically-formulated mixture that can yield a polymer brick unit that can, in one embodiment, serve as a replacement for bricks or concrete. For example, a PMU in accordance with the present disclosure can have significant compression strength, such that it can arise to or exceed ASTM standards. In another embodiment, a PMU composition can require a specific amount and/or range of polymer to achieve desired qualities. For example, it has been observed that a specific amount of polymer must be used, or the PMU could be unstable, brittle, or un-settleable. In one embodiment, a PMU mixture comprising greater than, e.g., 10% by weight of polymer has been observed to yield a PMU with compromised structural integrity, such that the PMU mixture cannot retain a shape of a modular brick mold. In another embodiment, a PMU mixture comprising less than 1% by weight of polymer can yield a PMU that is unable to withstand compression forces, such that the PMU cannot be a suitable construction material. In another embodiment, a PMU mixture comprising greater than, e.g., 10% by weight of polymer, or less than 1% by weight of polymer has been observed to yield a PMU that may not be suitable for extrusion, such that the PMU mixture cannot be effectively extruded to form a slug band that can be cut into a PMU or brick unit.

In another embodiment, the PMU mixture can be thick but malleable, and wet and formable so it can be manipulated. In another embodiment, the manipulation period can be limited, such as once it begins to cure and harden. In one exemplary embodiment, the cure time can be within 24 hours. In one exemplary embodiment, the cure time can be between 48 hours to 72 hours. In one embodiment, and such as can be due to the fluid nature of the mixture, the mixture can also be sprayed. In one exemplary embodiment, the mixture can be sprayed onto the surface of a house. In another exemplary embodiment, color can be added to the mixture. For example, color can be added to the mixture during the mixing process and the colored mixture can be sprayed onto a surface. Alternatively, PMUs can be traditionally painted and/or sealed. In another embodiment, another benefit of the PMU of embodiments is the R-rating of the material. The heat absorption and radiation properties of brick and concrete are significantly greater than those of the PMU of embodiments.

It is an object of the disclosure to provide a method of forming a polymer masonry unit. It is a further object of the disclosure to provide a method of forming a polymer masonry unit using an extrusion process, and a system for forming a polymer masonry unit using an extrusion process. These and other objects are provided by the present disclosure, including at least the following embodiments.

In one embodiment, a method of forming a polymer masonry unit is provided. The method includes mixing together a rock base material, a polymer, and water to form a mixture having a wet mixture weight. In embodiments, the amount of the water to be mixed is determined based on a target moisture content for the mixture. The method also includes extruding the mixture through an extruder mold to form one or more polymer masonry units, and drying the one or more polymer masonry units. In embodiments, the polymer comprises 1-10% of the wet mixture weight, and the rock base material is a calcium carbonate aggregate.

In another embodiment, a method of forming a polymer masonry unit is provided. The method includes mixing 80-90% of a base material, 1-10% of a polymer, and 1-10% of water to form a slurry. In embodiments, the slurry excludes sodium carbonate. The method also includes directing the slurry into a feeder hopper configured to homogenize the slurry and to optimize a feeding rate for feeding the slurry into an extruder, extruding the slurry through the extruder to form a slug band onto a receiving surface, cutting the slug band into one or more individual polymer masonry units, and drying the one or more individual polymer masonry units.

In yet another embodiment, a system for forming a polymer masonry unit is provided. The system includes a mixture manager configured to mix 80-90% of a base material, 1-10% of a polymer, and 1-10% of water to form a mixture. In embodiments, the mixture excludes sodium carbonate. The system also includes a feeder hopper configured to homogenize the mixture and to optimize a feeding rate for feeding the mixture into an extruder, the extruder configured to extrude the mixture through the extruder to form a slug band onto a receiving surface, a slug cutter configured to cute the slug band into one or more individual polymer masonry units, and a drier configured to dry the one or more individual polymer masonry units.

BRIEF DESCRIPTION OF THE DRAWINGS

The present disclosure will be readily understood by the following detailed description, taken in conjunction with the accompanying drawings that illustrate, by way of example, the principles of the present disclosure. The drawings illustrate the design and utility of one or more exemplary embodiments of the present disclosure, in which like elements are referred to by like reference numbers or symbols. The objects and elements in the drawings are not necessarily drawn to scale, proportion, or precise positional relationship. Instead, emphasis is focused on illustrating the principles of the present disclosure.

DETAILED DESCRIPTION

The disclosure presented in the following written description and the various features and advantageous details thereof, are explained more fully with reference to the non-limiting examples included in the accompanying drawings and as detailed in the description. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can recognize the members of the genus. Accordingly, these examples should not be construed as limiting the scope of the claims.

A person of ordinary skill in the art would understand that any system claims presented here-in encompass all of the elements and limitations disclosed therein, and as such, require that each system claim be viewed as a whole. Any reasonably foreseeable items functionally related to the claims are also relevant. The Examiner, after having obtained a thorough understanding of the disclosure and claims of the present application has searched the prior art as disclosed in patents and other published documents, i.e., nonpatent literature. Therefore, as evidenced by issuance of this patent, the prior art fails to disclose or teach the elements and limitations presented in the claims as enabled by the specification and drawings, such that the presented claims are patentable under the applicable laws and rules of this jurisdiction.

Figure 1:
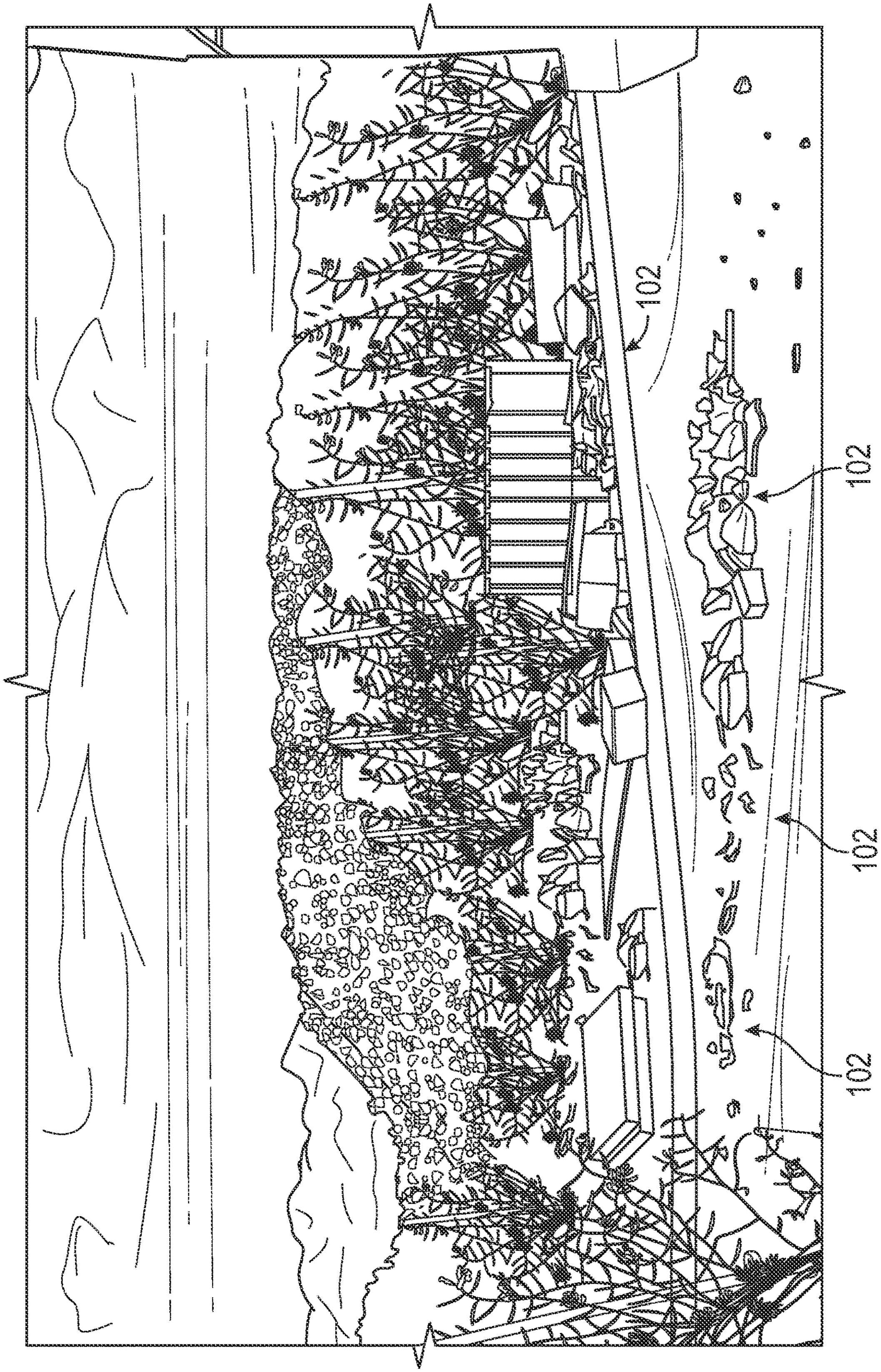
FIG. 1 illustrates a perspective view of an exemplary stone quarry, in accordance with one or more exemplary embodiments of the present disclosure.

FIG. 1 illustrates a perspective view of an exemplary stone quarry 100 in accordance with one or more embodiments of the present disclosure. Significant quarry byproduct (rock base material) (stone quarry byproduct) (aggregate) (stone quarry aggregate) 102 can be generated, such as during crushing and washing operations. In one embodiment, there can be three types of quarry byproducts resulting from these operations: screenings, pond fines, and baghouse fines. In another embodiment, the quarry byproduct 102 generated from these operations can be similar in concept to sawdust but can include fine dust and small stone fragments.

In another embodiment, quarry byproduct 102 can also be generated by hydraulically splitting the stone billet or chipping it to fabricate the finished goods. In another embodiment, quarry byproduct 102 can take the form of remnants of larger waste material that cannot be used in a given project. In one embodiment, such quarry byproduct 102 can be mixed with a polymer and/or for fabricating a polymer masonry unit. In another embodiment, the quarry byproduct 102 can be filtered to remove excessively large stone fragments. In one exemplary embodiment, the quarry byproduct 102 can be calcium carbonate (calcium carbonate aggregate). In one embodiment, the quarry byproduct 102 can include limestone byproduct. In one exemplary embodiment, the byproduct can be limestone. In one embodiment, quarry byproduct 102 (e.g., limestone byproduct) can be 40 parts per million calcium, which makes it 100% calcium carbonate. In one embodiment, the molecular composition and/or calcium content can be important—for example, 100% calcium carbonate can be considered a pure element that is less susceptible to degradation. In one embodiment, calcium carbonate can have the same characteristics as the limestone slab. In another embodiment, quarry byproduct 102 can be any stone quarry byproduct, rock dust, stone fragments, or other suitable rock-based byproduct.

In another exemplary embodiment, saws (e.g., Vermeer saws) can actively mine surface rock at a stone quarry 100 into blocks used for production. In one embodiment, these blocks can then be fabricated with additional saws (e.g., Cobra saws) that can transform blocks into slabs of different heights, such as from 1" to 16". In another embodiment, these slabs can then be introduced into the finishing stages where they are refined into chopped stone or sawed stone. In another embodiment, these finished goods can then be marketed and sold as smooth or chopped stone in full veneer with a thickness ranging from, e.g., 3-5" in width to accommodate a brick ledge used in commercial and residential construction. In another embodiment, these same blocks can be used as thin veneer applications ranging in thickness from, e.g., 1-1.5" and used in commercial and residential construction. In one example, stone quarry processes can generate an average of 38% waste depending on the process and application employed to produce the finished product.

Figure 2:
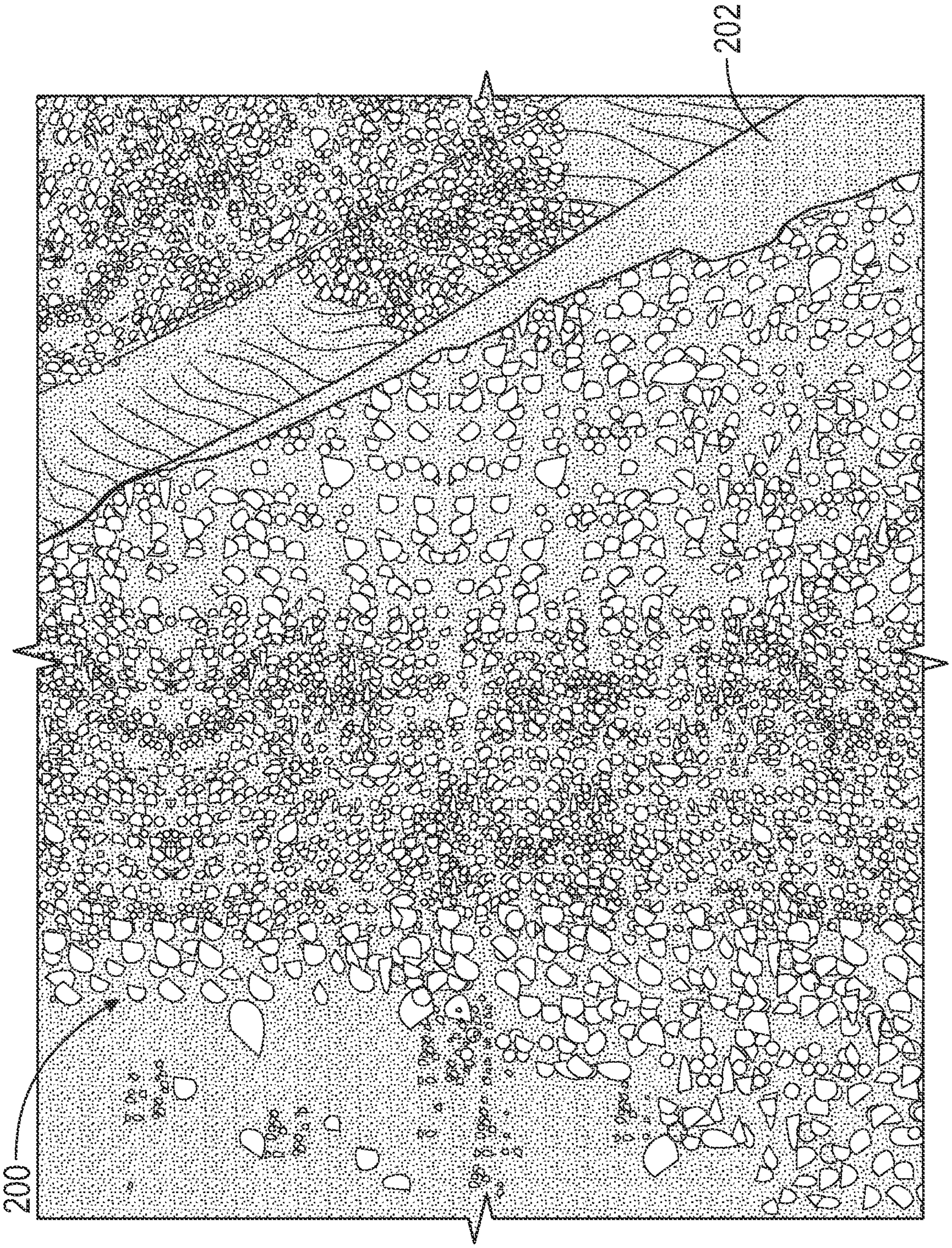
FIG. 2 illustrates a perspective view of a quarry byproduct mound, in accordance with one or more exemplary embodiments of the present disclosure.

FIG. 2 illustrates a perspective view of a quarry byproduct mound 200 at a rock quarry, in accordance with one or more exemplary embodiments of the present disclosure. In one embodiment, the quarry byproduct can be limestone byproduct that can be typically collected by piling it into a mound. In one embodiment, the mound can continue to grow as quarry operations continue. In another embodiment, once it rains, the excess can set and harden. In another embodiment, quarry byproduct can be formed during sawing of a rock shelf, which can form a crevasse or trail, such as saw trail 202. Generally, the aggregate 200 can accumulate at these areas.

Figure 3A:
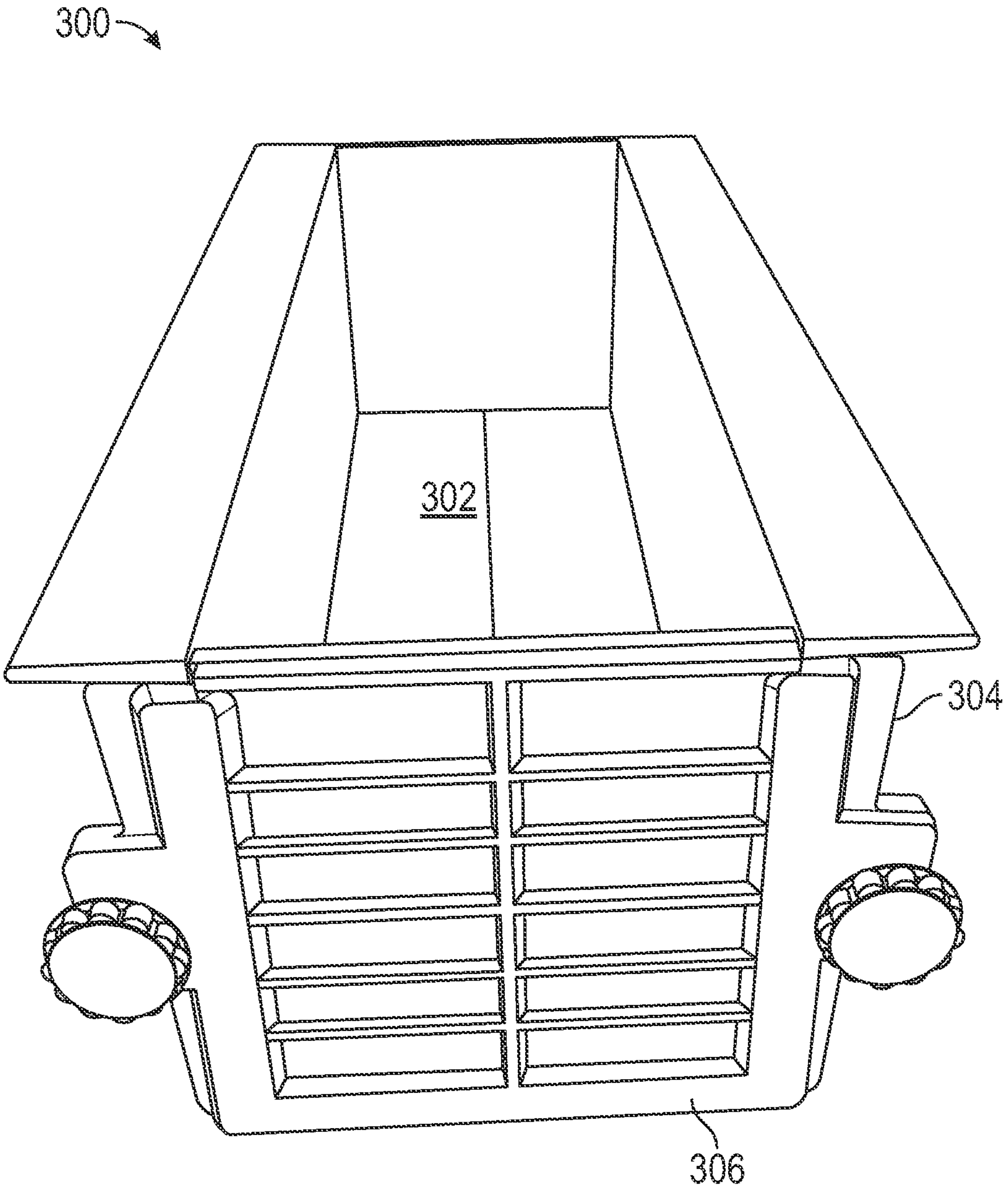
FIG. 3A illustrates a perspective view of a polymer masonry unit mold, in accordance with one or more exemplary embodiments of the present disclosure.

FIG. 3A illustrates a perspective view of a polymer masonry unit mold, in accordance with one or more exemplary embodiments of the present disclosure. In one embodiment, the mold 300 can include a receptacle 302 and a frame 304. In another embodiment, the mold 300 can include a door 306 or other access point, such as to facilitate the removal of a polymer masonry unit from the mold 300. In another embodiment, mixing quarry byproduct with a polymer and water can create a mixture that can be poured into the mold 300, or into any other suitable mold. In one embodiment, the ingredients can be mixed until reaching the consistency of a paste, (e.g., using a hand drill and a mixing attachment or other suitable mixing process). In another embodiment, the mold 300, receptacle, 302, and/or frame 304 can be of any shape and can have ornamentation that can be impressed or embossed into the mixture. In one embodiment, the mold 300 can be made of metal, plastic, or other suitable material.

Figure 3B:
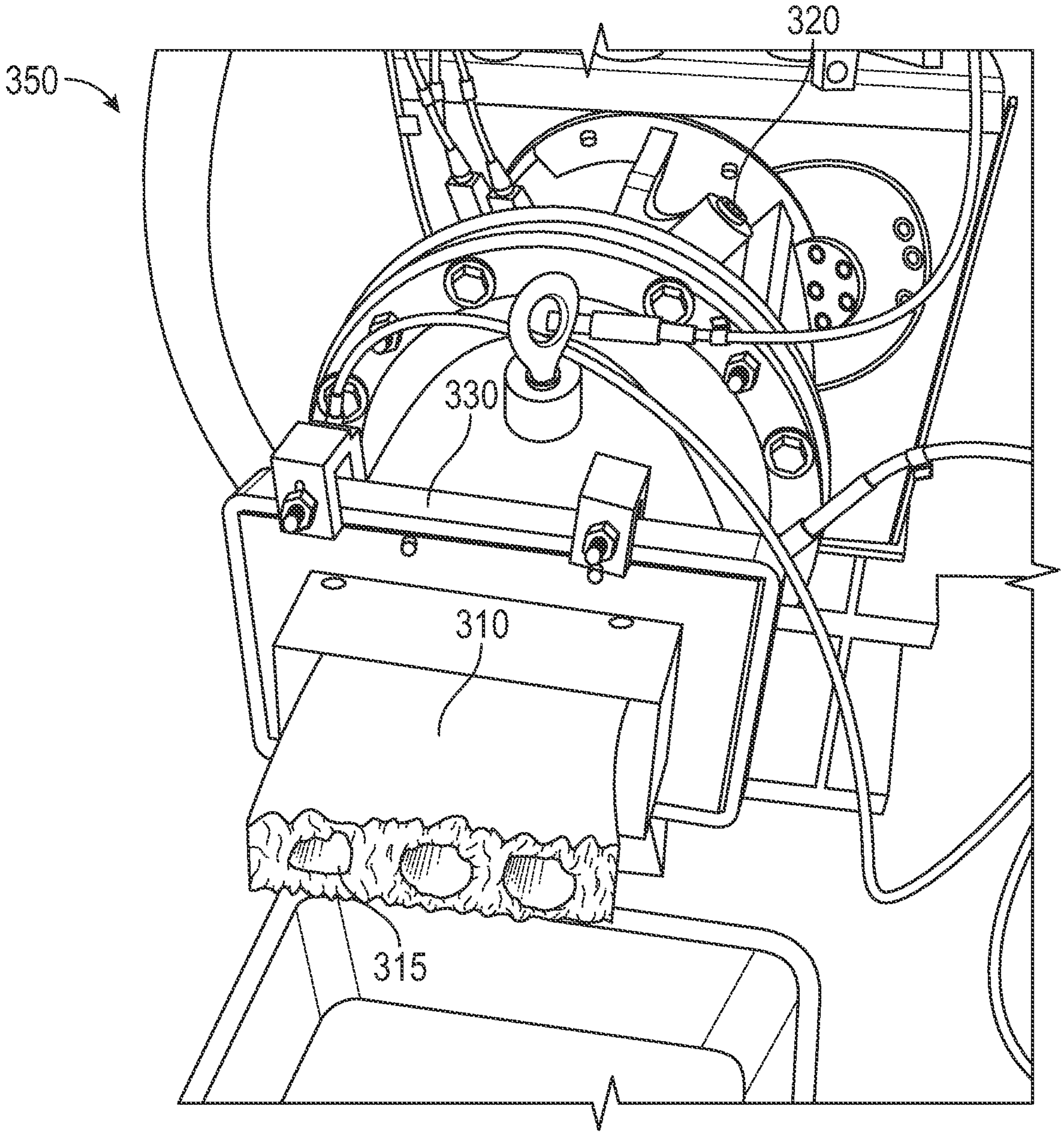
FIG. 3B illustrates a perspective view of a polymer masonry unit extruder, in accordance with one or more exemplary embodiments of the present disclosure.

FIG. 3B illustrates a perspective view of a polymer masonry unit extruder 350 implemented in accordance with one or more exemplary embodiments of the present disclosure. In one embodiment, extruder 350 may include an auger module 320 and an extruder mold 330. In embodiments, a mixture may be made that includes the quarry byproduct (e.g., calcium carbonate aggregate, such as limestone), the polymer, and water, such as in a particular proportions (e.g., 80-90% the quarry byproduct, 1-10% polymer, and 1-10% water). The mixture may be mixed until reaching a consistency of a paste that is suitable to be moved through extruder 350.

Auger module 320 may be configured to receive the mixture and to feed the mixture through extruder mold 330. In embodiments, auger 320 may be configured with a mechanism (e.g., blades, helical shaft, boring mechanism, etc.) that presses, pushes, or otherwise moves the mixture toward and against extruder mold 330 at a particular rate. In this manner, auger 320 may feed the mixture to extruder mold 330 at a feeding rate. In embodiments, a vacuum may be used to facilitate the feeding of the mixture by auger module 320 into and through extruder mold 330, such as by providing a vacuum force for moving the mixture at a uniform and/or constant feeding rate. In some embodiments, the vacuum may also facilitate compression of the mixture, as well as removing air pockets form the mixture.

Extruder mold 330 may include one or more dies that may be configured to receive the mixture pushed by auger 320 and to output slug band 310. Slug band 310 may represent the extruded form of the mixture as formed by the one or more dies of extruder mold 330. For example, as slug band 310 is extruded from extruder mold 330, the one or more dies of extruder mold 330 may impart a form or shape onto slug band 310, which may be a rectangular form, in which case slug band 310 may have a rectangular shape and may be a rectangular band. In embodiments, the one or more dies of extruder mold 330 may be configured with different shapes and may be interchangeable, such that a first die may impart a first shape onto slug band 310 when extruded from extruder mold 330 using the first die, and a second die may impart a second shape, different from the first shape, onto slug band 310 when extruded from extruder mold 330 using the second die. In this manner, extruder mold 330 may operate to shape the mixture into slug band 310.

In embodiments, the dimensions of slug band 310, in particular the height and width (where length is along the extrusion axis) of slug band 310 may be determined based on operations requirements. For example, the height and width may be determined based on the size of the brick or PMU being manufactured. The dimensions of the brick may vary, and in this case, the height and width of slug band 310 may be obtained by extruder mold 330. For different dimensions for slug band 310, a different extruder mold 330 may be used.

In embodiments, extruder mold 330 may include functionality to create one or more cores in slug band 310. A core may refer to a void, hole, or negative space within the interior of slug band 310. For example, as shown in FIG. 3B, slug band 310 may include three cores 315. In some embodiments, the number of cores that may be formed into slug band 310 may be one or more.

Figure 3C:
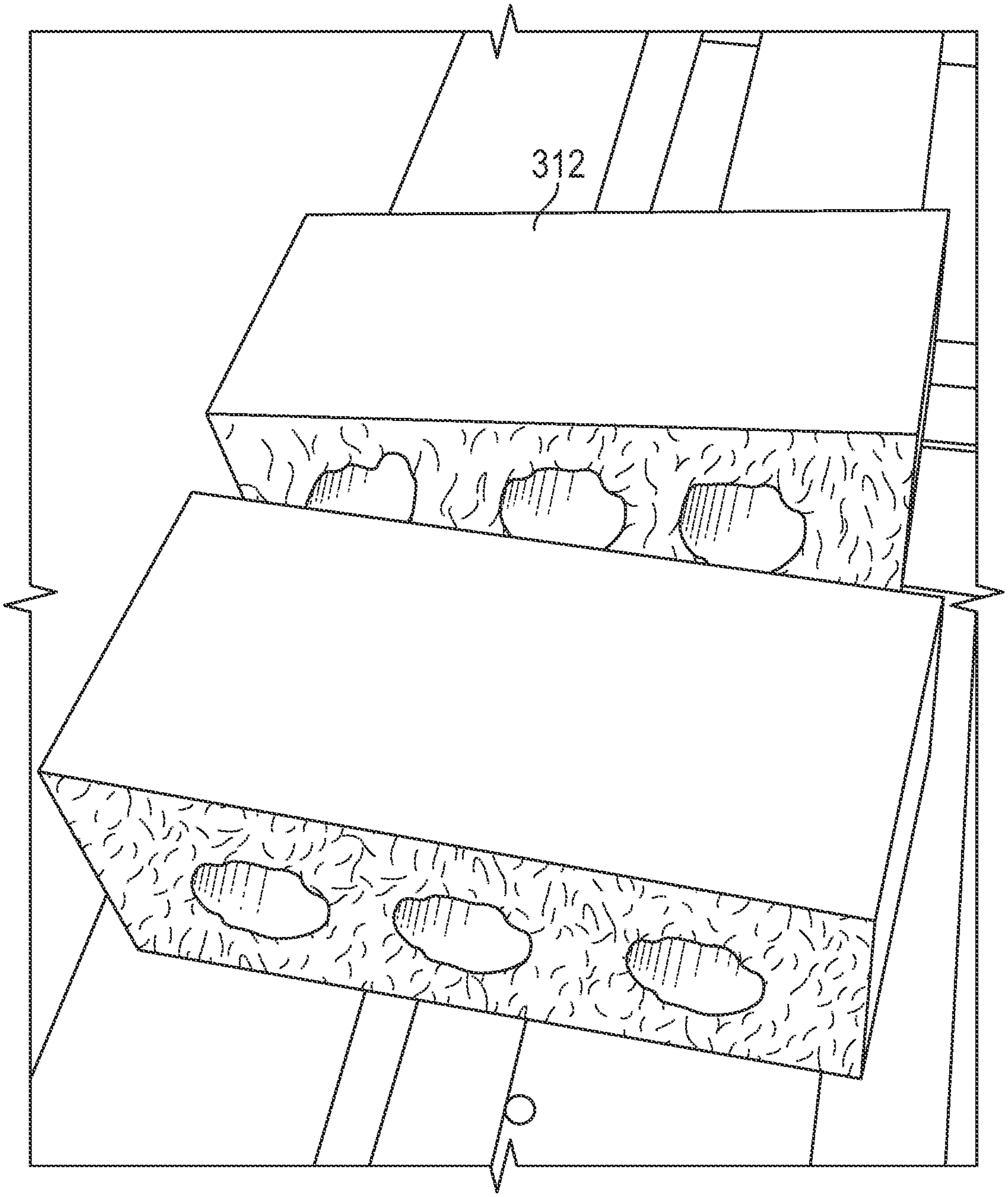
FIG. 3C illustrates an example of a polymer masonry unit 312 as cut from a slug band in accordance with one or more exemplary embodiments of the present disclosure.

In embodiments, slug band 310 may be cut into individual brick units or PMUs. For example, slug band 310 may be cut along the cross-sectional axis (e.g., orthogonal to the extrusion axis) to form the individual brick units or PMUs. The size of each individual PMU may be determined based on operational requirements, but in some embodiments may be based on the brick being manufactured. In particular, as the height and width of slug band 310 is determined by extruder mold 330, the dimensions of the individual PMUs may be based on the location along the length of slug band 310 at which the cut is made. FIG. 3C illustrates an example of a PMU 312 as cut from a slug band in accordance with one or more exemplary embodiments of the present disclosure. As shown in FIG. 3C, PMU 312 may be formed after slug band 310 has been cut along the cross-sectional axis at a location along the length of slug band 310. The result here is a brick unit or PMU.

After the slug band 310 is cut into individual PMUs, the individual PMUs may be dried in a drying room where, upon drying, the PMU may harden into a brick. In embodiments, the PMUs may dry upon evaporation of the moisture within it (e.g., the moisture content in the mixture from which the individual PMUs were formed).

Figure 4:
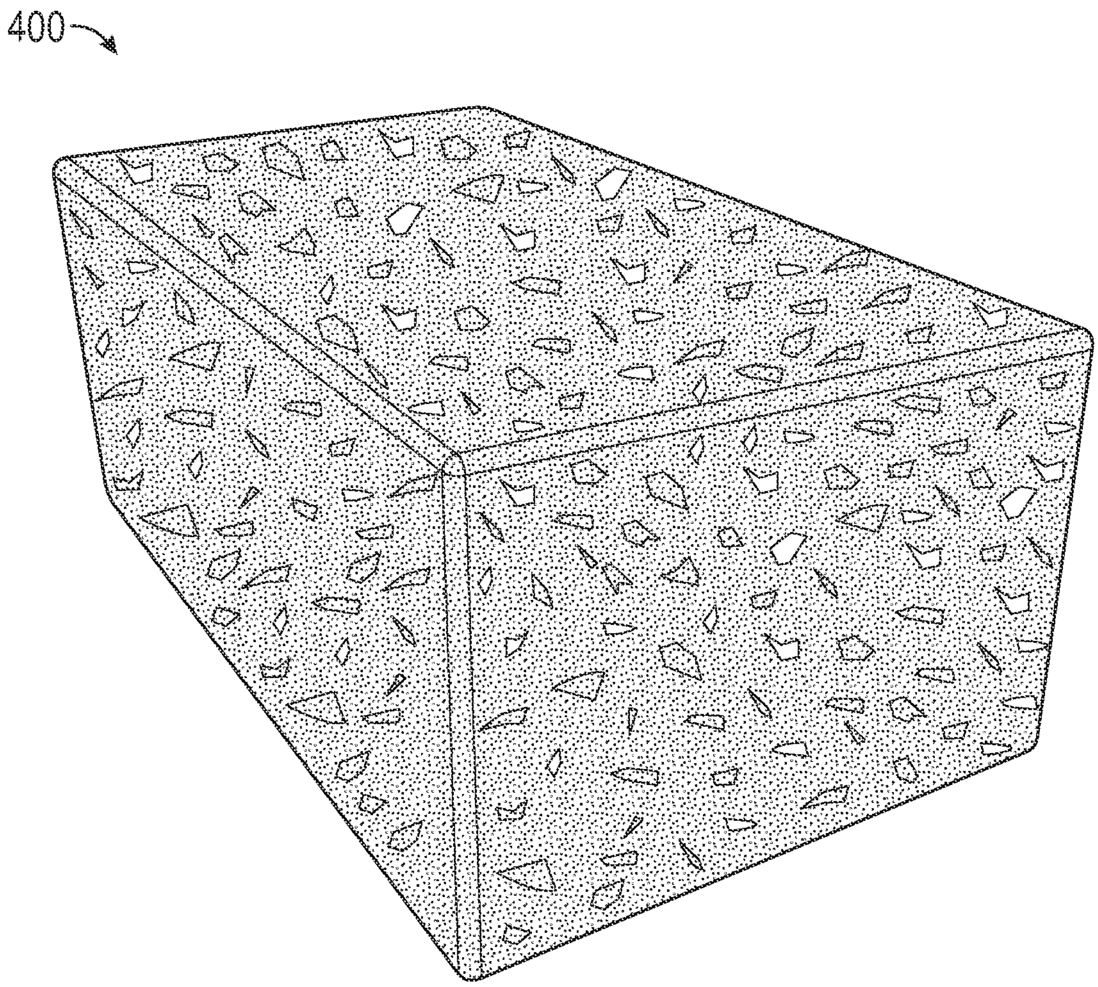
FIG. 4 illustrates a perspective view of a polymer masonry unit, in accordance with one or more exemplary embodiments of the present disclosure.

FIG. 4 illustrates a perspective view of a polymer masonry unit 400, in accordance with one or more exemplary embodiments of the present disclosure. In one exemplary embodiment, the polymer masonry unit 400 can include: quarry byproduct (e.g., 34 lbs. of limestone) mixed with a polymer (e.g., 1.2 ounces of an acrylic copolymer-based polymer) and water (e.g., 8 ounces). In another exemplary embodiment, the quarry byproduct can comprise granite, clay, gypsum, marble, slate, or other suitable rock. In another exemplary embodiment, the polymer can comprise any natural or synthetic polymer. In another exemplary embodiment, the paste can then be poured into a mold of approximate size 3"×3"×9" up to 6"×6"×24" (or other suitable dimensions) and allowed to cure for a predetermined time period (e.g., 24 hours), without the application of any heat. In another exemplary embodiment, the paste can be fully cured in 48 hours and a polymer masonry unit 400 (block or brick) can be extracted from the mold.

In another exemplary embodiment, the paste can be extruded from an extruder with an extruder mold that extrudes a slug band of approximately 3"×9" up to 6"×24" (with a length along the axis of extrusion) and then cut cross-sectionally at approximately 3" to 6" intervals along the length of the slug band, which may result in a polymer masonry unit 400 with a size of approximately 3"×3"×9" up to 6"×6"×24" (or other suitable dimensions). The extruded and cut polymer masonry unit 400 may be allowed to cure for a predetermined time period (e.g., 24 hours), without the application of any heat. In another exemplary embodiment, the extruded and cut polymer masonry unit 400 can be fully cured in 48 hours.

In another embodiment, the polymer masonry unit 400 can be cured with a heat source, such as an oven. In another exemplary embodiment, the fabrication methods of cutting, splitting, and/or sanding can be applied to the polymer masonry unit. In another embodiment, and advantageously, the characteristics and structural stability of the polymer masonry unit 400 can match those of natural limestone.

In one embodiment, the polymer masonry unit 400 can be structurally stable. In one exemplary embodiment, the polymer masonry unit can meet or exceed the ASTM standard for structural stability. In another example, polymer masonry unit 400 can meet or exceed the ASTM standards for structural stability in regard to density in water absorption and specific gravity and compressive strength, among others. In another embodiment, the polymer masonry unit 400 mixture can be an alternative to concrete. In another embodiment, when the polymer masonry unit 400 gets radiated, there can be no emissions, in contrast to concrete.

In one exemplary embodiment, the polymer masonry unit 400 can have the look and feel of limestone. In another embodiment, the polymer masonry unit 400 can be sawed, hydraulically split with pressure, or cut by any other suitable mechanism. In another embodiment, the polymer masonry unit 400 can be finished applying a coat of a polymer (such as the same polymer that helps form the unit 400) on the surface of the polymer masonry unit, such as to seal the polymer masonry unit, and/or to minimize any powder or residue of the polymer masonry unit 400. In another embodiment, the polymer masonry unit 400 can be glazed, such as with ceramic, polymer, or any other suitable material. In another embodiment, voids (cores) can be disposed within the polymer masonry unit 400, such as to modify a weight of the polymer masonry unit 400.

In another embodiment, the polymer masonry unit 400 can comprise certain amounts of rock base material, polymer, and water. For example, a polymer masonry unit 400 can comprise 1-10% polymer by weight. In another embodiment, a polymer masonry unit 400 can comprise 5-8% polymer by weight. In another embodiment, a polymer masonry unit 400 can comprise less than 10% polymer by weight. In another embodiment, a polymer masonry unit 400 can comprise more than 3% polymer by weight. In another embodiment, the polymer masonry unit can comprise 90% rock base material by weight. In another embodiment, the polymer masonry unit can comprise 90-91.5% rock base material by weight. In another embodiment, the polymer masonry unit can comprise 91-92% rock base material by weight. In another embodiment, the polymer masonry unit can comprise 92-94% rock base material by weight. In another embodiment, polymer masonry unit 400 can comprise certain amounts of rock base material, polymer, and water to the exclusion of other materials. In particular, polymer masonry unit 400 may exclude sodium carbonate, in which case no sodium carbonate may be included in polymer masonry unit 400, as the presence of sodium carbonate may change the basic characteristics of polymer masonry unit 400.

In another embodiment, quarry byproduct like that used in the polymer masonry unit 400 can have a particular liquid limit, a particular plastic limit, and/or a particular plasticity index. For example, the quarry byproduct can have a liquid limit from 15-25%. In another embodiment, the quarry byproduct can have a plastic limit of 10-20%. In another embodiment, the quarry byproduct can have a plasticity index of 1-10%. In another embodiment, quarry byproduct can have any liquid limit, plastic limit, and/plasticity index such that the quarry byproduct is suitable to be utilized in a polymer masonry unit. In another embodiment, quarry byproduct can include any other sort of measurable index, including liquidity index, consistency index, flow index, toughness index, activity, or any other index, measurement, or constant associate with aggregate, soil, or any other particulate matter. In another embodiment, the polymer can be, e.g., T-PRO 500® by Terratech Inc. In another embodiment, the polymer can be a water-based emulsion of acrylic copolymer designed specifically for stabilization and dust suppression for a variety of soil types. In another embodiment, the polymer can be eco-safe, non-toxic, and specifically formulated to interact with soil chemistry and create high strength, durable, water-resistant bonds.

Figure 5:
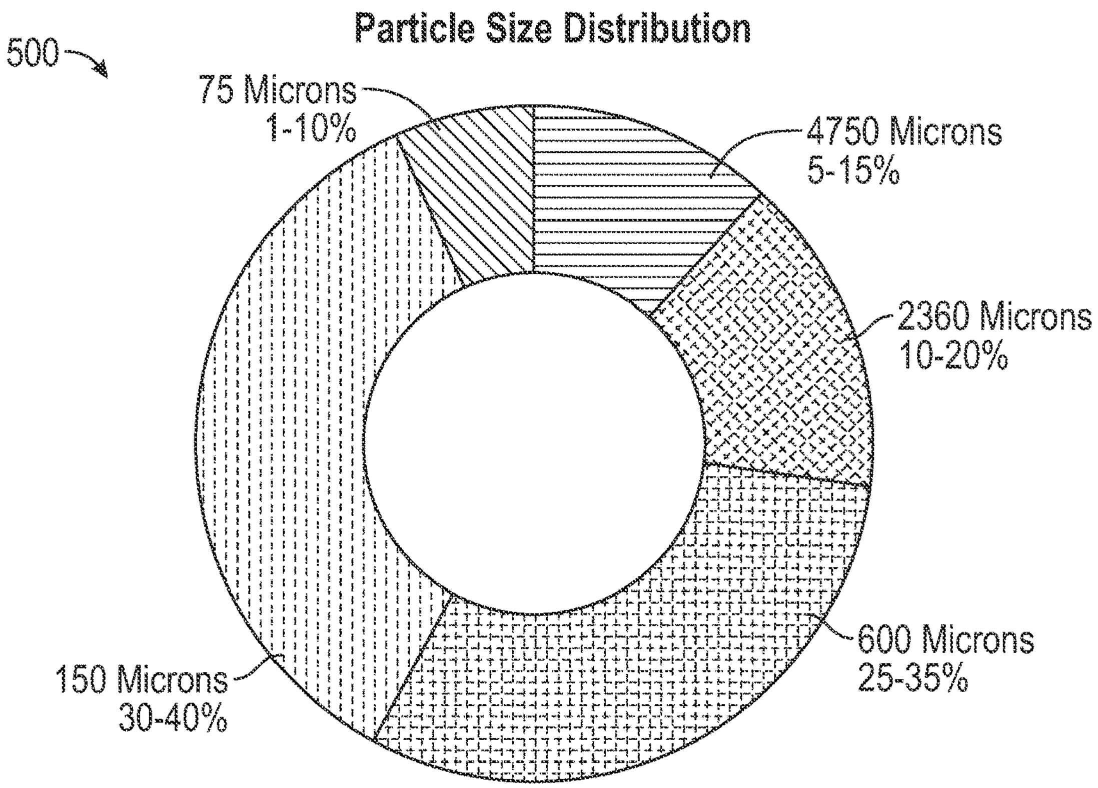
FIG. 5 illustrates an exemplary byproduct particle size distribution, in accordance with one or more exemplary embodiments of the present disclosure.

FIG. 5 depicts another embodiment of the present disclosure. In one embodiment, rock base material can include particles of several different sizes. For example, a quarry byproduct particle size distribution 500 can include particles of 4750 microns and larger, particles of 2360 microns to 4750 microns, particles of 600 microns to 2360 microns, particles from 150 microns to 600 microns, particles from 75 microns to 150 microns, particles from 53 microns to 75 microns, and/or particles smaller than 53 microns. In another embodiment, 5-15% by weight of particles of a rock base material can include particles of 4750 microns and larger. In another embodiment, 10-20% by weight of particles of a rock base material can include particles of 2360 microns to 4750 microns. In another embodiment, 25-35% by weight of particles of a rock base material can include particles of 600 microns to 2360 microns. In another embodiment, 30-40% by weight of particles of a rock base material can include particles from 150 microns to 600 microns. In another embodiment, 1-10% by weight of particles of a rock base material can include particles from 75 microns to 150 microns. In another embodiment, 0-1% by weight of particles of a rock base material can include particles from 53 microns to 75 microns. In another embodiment, 0-1% by weight of particles of a rock base material can include and/or particles smaller than 53 microns.

Figure 6:
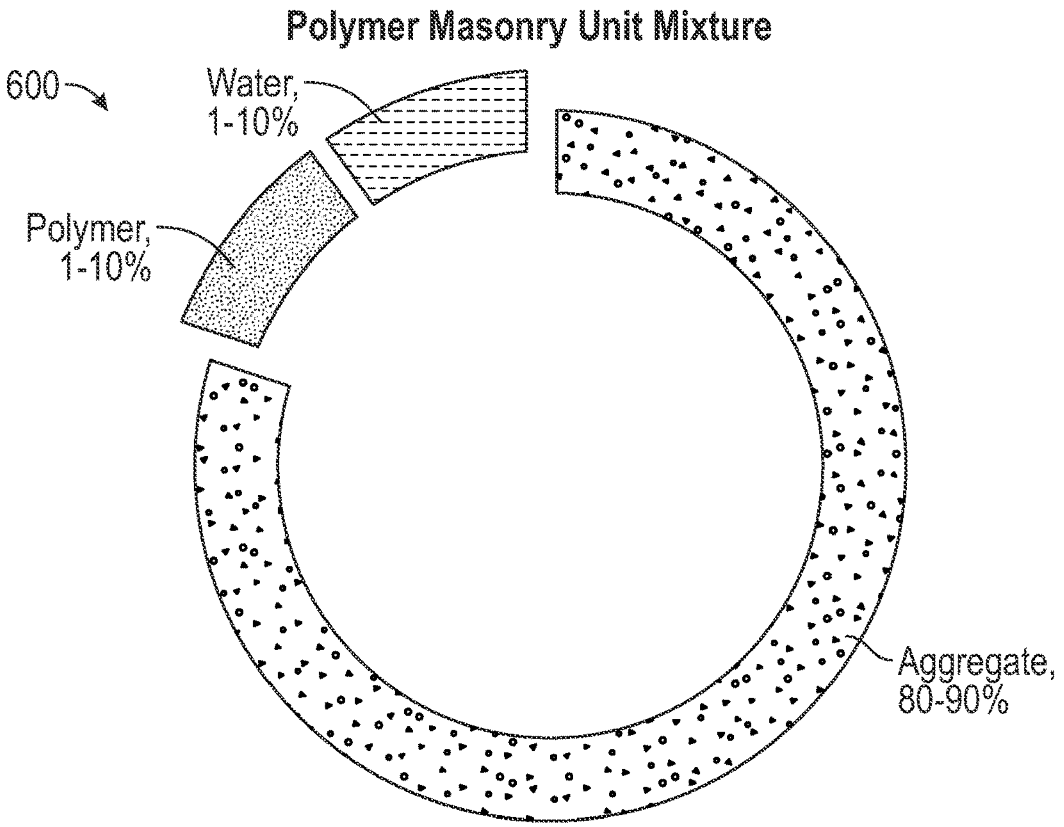
FIG. 6 illustrates an exemplary polymer masonry unit mixture composition distribution, in accordance with one or more exemplary embodiments of the present disclosure.

FIG. 6 depicts another embodiment of the present disclosure. A composition of a polymer masonry unit can include aggregate, polymer, and water. In one embodiment, a polymer masonry unit slurry composition (polymer masonry unit mixture composition) 600 can be described by a content of materials included in a mixture (slurry) that can harden into a polymer masonry unit. For example, a polymer masonry unit slurry composition 600 can be described by the comparative weights of materials included in a mixture viewed as a percentage of the total weight of the un-hardened mixture. For example, a polymer masonry unit slurry can include 10% by weight of water, 10% by weight of polymer, and 80% by weight of aggregate when the slurry is initially mixed together. In one embodiment, as the slurry hardens, the weight ratios can change, such as due to evaporation, seepage, etc. In one embodiment, a polymer masonry unit can be referred to as, e.g., a "10%" unit, such as if a polymer masonry unit slurry included 10% by weight polymer.

In one embodiment, 2-8% of a weight of the polymer masonry unit slurry composition 600 can be polymer. In one embodiment, 3-7% of a weight of the polymer masonry unit slurry composition 600 can be polymer. In one embodiment, substantially 2.5-3.5% of a weight of the polymer masonry unit slurry composition 600 can be polymer. In one embodiment, substantially 3.5-4.5% of a weight of the polymer masonry unit slurry composition 600 can be polymer. In one embodiment, 5% of a weight of the polymer masonry unit slurry composition 600 can be polymer. In one embodiment, 5.5-6% of a weight of the polymer masonry unit slurry composition 600 can be polymer. In one embodiment, 6-7.5% of a weight of the polymer masonry unit slurry composition 600 can be polymer. In one embodiment, 7.5-8.8% of a weight of the polymer masonry unit slurry composition 600 can be polymer. In one embodiment, substantially 9% of a weight of the polymer masonry unit slurry composition 600 can be polymer. In one embodiment, substantially 10% of a weight of the polymer masonry unit slurry composition 600 can be polymer.

In another embodiment, the polymer masonry unit mixture composition 600 can include a moisture content. In one embodiment, the moisture content can refer to an amount of fluid within the mixture, such as compared to the totality of the mixture. In one embodiment, the moisture content can be measured as a percent weight of the total mixture weight. For example, the polymer masonry unit slurry composition 600 can have a moisture content ranging from 1-20%; in another example, this can refer to the weight of the mixture that can be accounted for by a fluid in the mixture. In another embodiment, the moisture content of the composition 600 can include water as fluid. In another embodiment, the moisture content of the composition 600 can include a polymer as a fluid. In another embodiment, the moisture content of the composition 600 can include both water and a polymer as a fluid. For example, the amount of water and the amount of polymer in the composition 600 can be combined to account for a moisture content of the composition 600. In another example, if water comprises 4% of the composition 600 by weight, and the polymer comprises 10% of the composition 600 by weight, then the moisture content of the composition 600 can be, e.g., 14%.

In another embodiment, the moisture content of the composition 600 can be 1-5%. In another embodiment, the moisture content of the composition 600 can be 5-10%. In another embodiment, the moisture content of the composition 600 can be 10-15%. In another embodiment, the moisture content of the composition 600 can be 15-20%. In another embodiment, the moisture content 600 can be of any amount suitable to enable the compaction and/or molding of the composition 600, such as, e.g., into a polymer masonry unit. In another embodiment, the moisture content can correspond to an optimal moisture content of a particular aggregate, such as can be determined by, e.g., a Proctor compaction test. In another embodiment, a moisture content range can include an optimal moisture content of a particular aggregate, such as can be determined by, e.g., a Proctor compaction test.

In one embodiment, slurry composition 600 may include the calcium carbonate-based aggregate, the polymer, and the water to the exclusion of other materials. For example, in a particular embodiments, the calcium carbonate-based aggregate may be 100% calcium carbonate, in which case slurry composition 600 may include calcium carbonate, the polymer, and the water, and no other materials. For example, slurry composition 600 may exclude, in particular, sodium carbonate, in which case no sodium carbonate may be included in slurry composition 600, as the presence of sodium carbonate may change the basic characteristics of slurry composition 600. In particular, sodium carbonate is considered to be a source of efflorescence, which makes it highly undesirable as a brick material. Furthermore, sodium carbonate may be water soluble, which may lead to a reduction in the strength of the PMU when sodium carbonate is present in slurry composition 600.

In another embodiment, slurry composition 600 may include the calcium carbonate-based aggregate, the polymer, the water, and trace amounts of other materials that do not affect that basic characteristics of slurry composition 600 for making PMU in accordance with the present disclosure.

Figure 7:
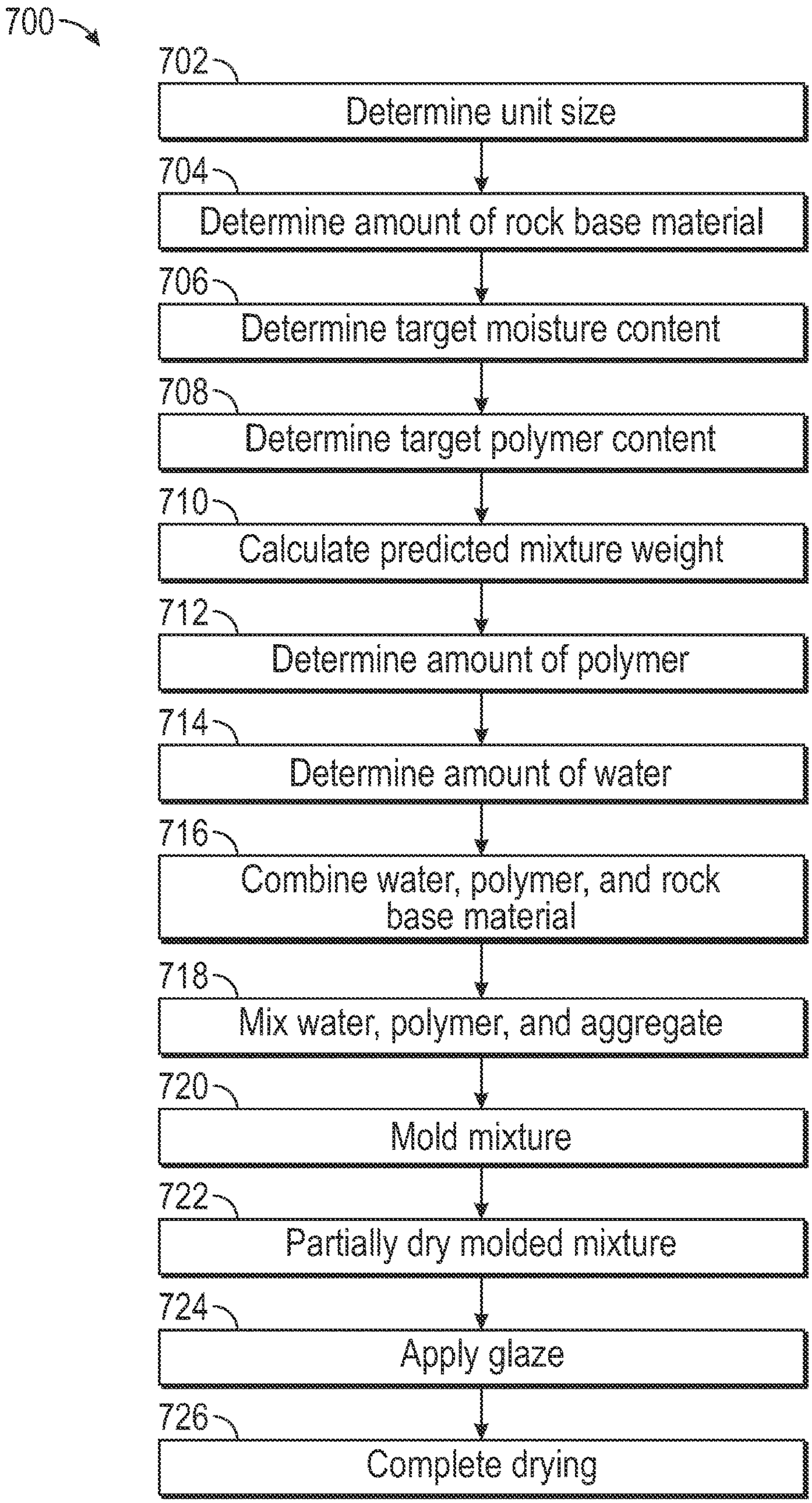
FIG. 7 illustrates an exemplary method of forming a polymer masonry unit, in accordance with one or more exemplary embodiments of the present disclosure.

FIG. 7 depicts another embodiment of the present disclosure. A method of forming a polymer masonry unit 700 can begin at step 702, where a unit size can be determined. For example, a polymer masonry unit can be of any suitable size for any suitable construction. In one embodiment, a unit can be 3⅝ inches by 2¼ inches by 7⅝ inches. In another embodiment, a unit can be 2¾ inches by 2¾ inches by 7⅝ inches. In another embodiment, a unit can be 2¾ inches by 2⅝ inches by 9⅝ inches. In one embodiment, a unit can take the form of a tile. In another embodiment, the unit can include any dimensions.

At step 704, In step 704, the amount of rock base material can be determined. In one embodiment, determining a unit size can assist in determining an amount of rock base material to be used. For example, a unit of a particular size can require a particular amount of rock base material. For example, a unit size of 3⅝ inches by 2¼ inches by 7⅝ inches can require 12.5 pounds of rock base material. In one embodiment, the rock base material can comprise the vast majority of the volume of a given unit, such as because the amount of water and/or polymer is comparatively small, and/or because the water and/or polymer can fill in spaces between rock base material particles such that the water and/or polymer does not substantially affect a volume and/or size of a mixture of rock base material, water, and polymer.

At step 706, a target moisture content can be determined. For example, a rock base material can have an optimal moisture content at which it will achieve a maximum dry density when compacted and dried. In one embodiment, a target moisture content can be from 8-20%, as calculated by dividing the weight of moisture by the total weight of rock base material with moisture in the rock base material. In another embodiment, the target moisture content can be from 12-16%. In another embodiment, the target moisture content can be in any range or amount that can facilitate the compaction and sufficient dry density of the rock base material.

At step 708, a target polymer content can be determined. For example, a unit and/or unit mixture can have varying degrees of polymer as compared to the rock base material and/or water that can lend distinct properties to a given unit. In one embodiment, including less polymer can lead to a more brittle unit. In another embodiment, using more polymer can lead to a more malleable unit. In one embodiment, a specific polymer content of a unit mixture and/or unit can provide optimal compression strength. In one embodiment, a target polymer content can be from 1-10% of a wet mixture weight. In another embodiment, a target polymer content can be less than 8%. In another embodiment, a target polymer content can be more than 2%.

At step 710, a predicted mixture weight (predicted wet mixture weight) can be calculated. For example, the amount of rock base material determined at step 704 and the target moisture content determined at step 706 can be utilized to calculate the predicted mixture weight. For example, if the rock base material amount and/or weight is known, and it is also known what the moisture content should be to achieve the target moisture content, a predicted wet mixture weight can thereby be calculated.

At step 712, an amount of polymer can be determined. For example, the target polymer content determined at step 708 can be utilized with the predicted mixture weight calculated at step 710 to arrive at an amount of polymer. For example, if a predicted mixture weight is 13 pounds, and a target polymer content is 3%, it can be determined that 3% of the 13 pounds should be the amount of polymer.

At step 714, an amount of water can be determined. In one example, an amount of water be determined using amount of polymer and the target moisture content. For example, the amount of polymer can be included in a moisture content consideration—in other words, a moisture content can include polymer that provides fluid that can be considered moisture. In another embodiment, an amount of polymer can comprise a portion of the moisture content, and an amount of water can comprise the remainder of the moisture content not accounted for by the polymer. For example, and in one embodiment, if a target moisture content is 10% by weight of the wet unit mixture, and the amount of polymer determined at step 712 is 3% by weight of the wet unit mixture (which can, e.g., correspond to the target polymer content determined at step 708), 30% of the total moisture content can be accounted for by the polymer. In one embodiment, an amount of water can then be determined to be 7% by weight of the wet unit mixture, such that the entire moisture content can be 10% of the wet unit mixture. In another embodiment, the amount of water can be any amount necessary to add with the polymer to achieve the target moisture content.

At step 716, the amount of rock base material determined at step 704, the amount of polymer determined at step 712, and the amount of water determined at step 714 can be combined. In one embodiment, the amount of water and the amount of polymer can be combined first and subsequently added to the amount of rock base material. In another embodiment, the three components can be combined simultaneously. In another embodiment, a portion of a mixture of water and polymer can first be added (e.g., to a receptacle, such as receptacle 302 of mold 300 or to any other suitable receptacle), followed by a portion of the amount of rock base material, and the water, polymer, and rock base material can then be added alternately until the entire amounts of the materials are utilized. In another embodiment, the water, polymer, and rock base material can be combined in any order or manner suitable to facilitate the mixing of the materials, such as to, in one embodiment, form a substantially homogenous mixture.

At step 718, the combined materials from step 716 can be mixed together to form a unit mixture. In one embodiment, the unit mixture can be mixed until it is substantially homogenous. In another embodiment, the unit mixture can have a weight (wet mixture weight). The combination can be mixed in any suitable receptacle, such as a bucket, bowl, tough, or any other suitable receptacle. In another embodiment, the combination can be mixed in, e.g., a receptacle, such as receptacle 302 of mold 300. In another embodiment, steps 716 and 718 can be performed simultaneously.

At step 720, the mixture formed at step 718 can be molded. For example, the mixture can be applied to a receptacle of a mold (e.g., receptacle 302 of mold 300). In one embodiment, the mixture can be added such that it lays in the mold in a uniform fashion, such as to, e.g., facilitate molding of the mixture into a uniform shape.

At step 722, the mixture can be partially dried. In one embodiment, the mixture can be air dried, such as until the mixture is substantially solid, such that it can be removed from the mold. In another embodiment, the mixture can be dried in an oven or with any other suitable heat source.

At step 724, a glaze can be applied to the mixture. In one embodiment, the glaze can be a polymer (such as, e.g., the polymer utilized in the mixture), a ceramic glaze, or any other suitable glaze. In another embodiment, the glaze can be any material suitable to facilitate the sealing of the mixture, such as against moisture.

At step 726, the drying process can be completed to form a polymer masonry unit. For example, the mixture can be subjected to further air drying. In another embodiment, the partially dried mixture can be oven dried. In another embodiment, the mixture can be dried with a heat source. In another embodiment, the mixture can be dried without a heat source.

Figure 8:
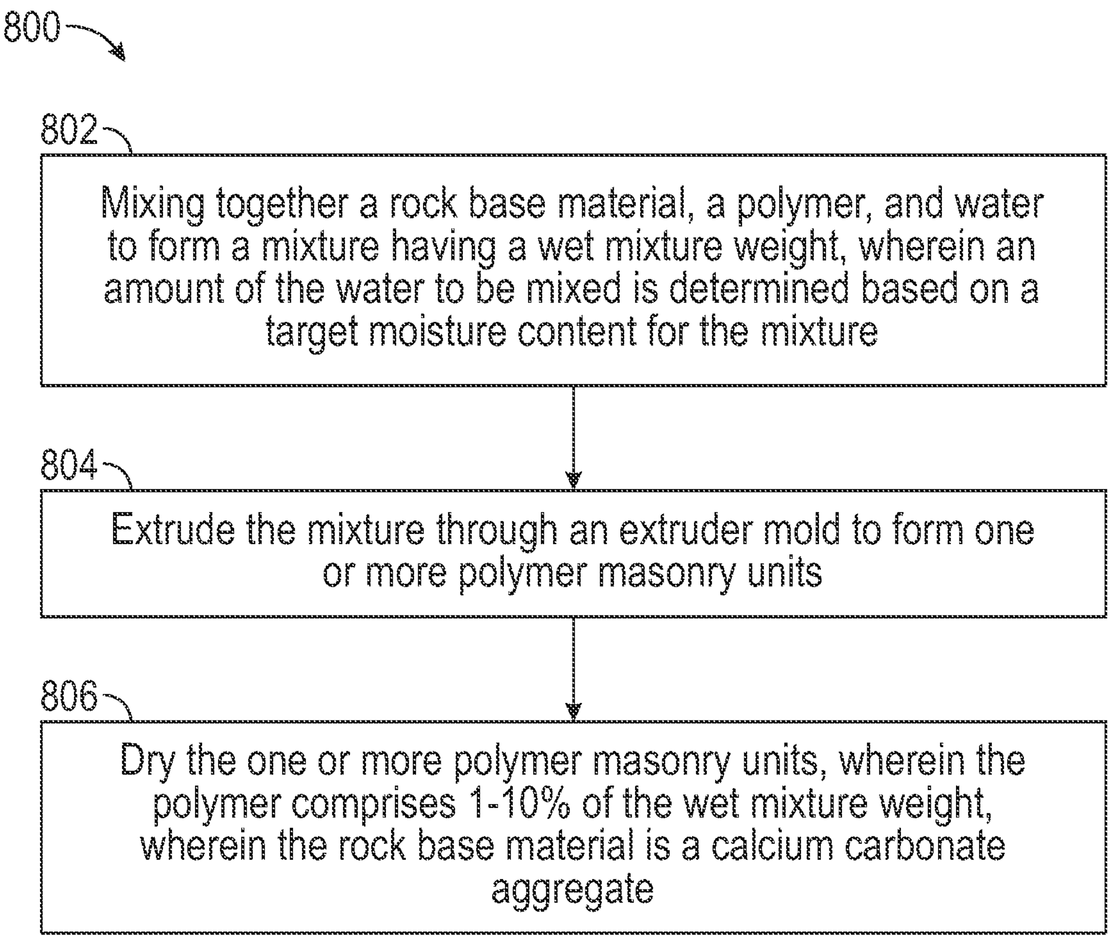
FIG. 8 illustrates another exemplary method of forming a polymer masonry unit in accordance with one or more exemplary embodiments of the present disclosure.

FIG. 8 depicts another embodiment of the present disclosure. A method of forming a polymer masonry unit 800 may begin at step 802, where a rock base material, a polymer, and water is mixed together to form a mixture having a wet mixture weight. In embodiments, the mixture may be mixed until it is substantially homogenous. In another embodiment, the mixture may have a weight (wet mixture weight). The combination may be mixed in any suitable receptacle, such as a bucket, bowl, tough, or any other suitable receptacle. In embodiments, the polymer comprises 1-10% of the wet mixture weight, and the rock base material is a calcium carbonate aggregate. In embodiments, the mixture may exclude materials other than the rock base material, the polymer, and the water. In one embodiments, the mixture may exclude sodium carbonate.

In embodiments, the amount of the water to be included in the mixture may be determined based on a target moisture content for the mixture. For example, a rock base material may have an optimal moisture content at which it will achieve a maximum dry density when compacted and dried. In one embodiment, a target moisture content may be from 8-20%, as calculated by dividing the weight of moisture by the total weight of rock base material with moisture in the rock base material. In another embodiment, the target moisture content may be from 12-16%. In another embodiment, the target moisture content may be in any range or amount that may facilitate the compaction and sufficient dry density of the rock base material. The amount of water may be determined based on the target moisture content. For example, the amount of polymer may be included in a moisture content consideration, such that a moisture content may include polymer that provides fluid that may be considered moisture. In another embodiment, an amount of polymer may comprise a portion of the moisture content, and an amount of water may comprise the remainder of the moisture content not accounted for by the polymer. For example, and in one embodiment, if a target moisture content is 10% by weight of the wet mixture, and the amount of polymer in the mixture is 3% by weight of the wet mixture (which may, e.g., correspond to the target polymer content), 30% of the total moisture content may be accounted for by the polymer. In one embodiment, an amount of water may then be determined to be 7% by weight of the wet mixture, such that the entire moisture content may be 10% of the wet mixture. In another embodiment, the amount of water may be any amount necessary to add with the polymer to achieve the target moisture content.

At step 804, the mixture may be extruded through an extruder mold to form one or more polymer masonry units. For example, the mixture may be extruded through an extruder (e.g., extruder 350 of FIG. 3B) to extrude a slug band (e.g., slug band 310 of FIG. 3C) having dimensions and a shape based on one or more dies of an extruder mold of the extruder. The slug band may be extruded from the extruder at a particular extrusion rate. In embodiments, the slug band may be cut cross-sectionally at particular locations along the length of the slug band to form individual polymer masonry units.

At step 806, the individual polymer masonry units may be dried. In some embodiments, the individual polymer masonry units may be air dried, without a heat source, such as until the individual polymer masonry units are substantially solid. In other embodiments, the individual polymer masonry units may be dried in an oven or with any other suitable heat source.

Figure 9:
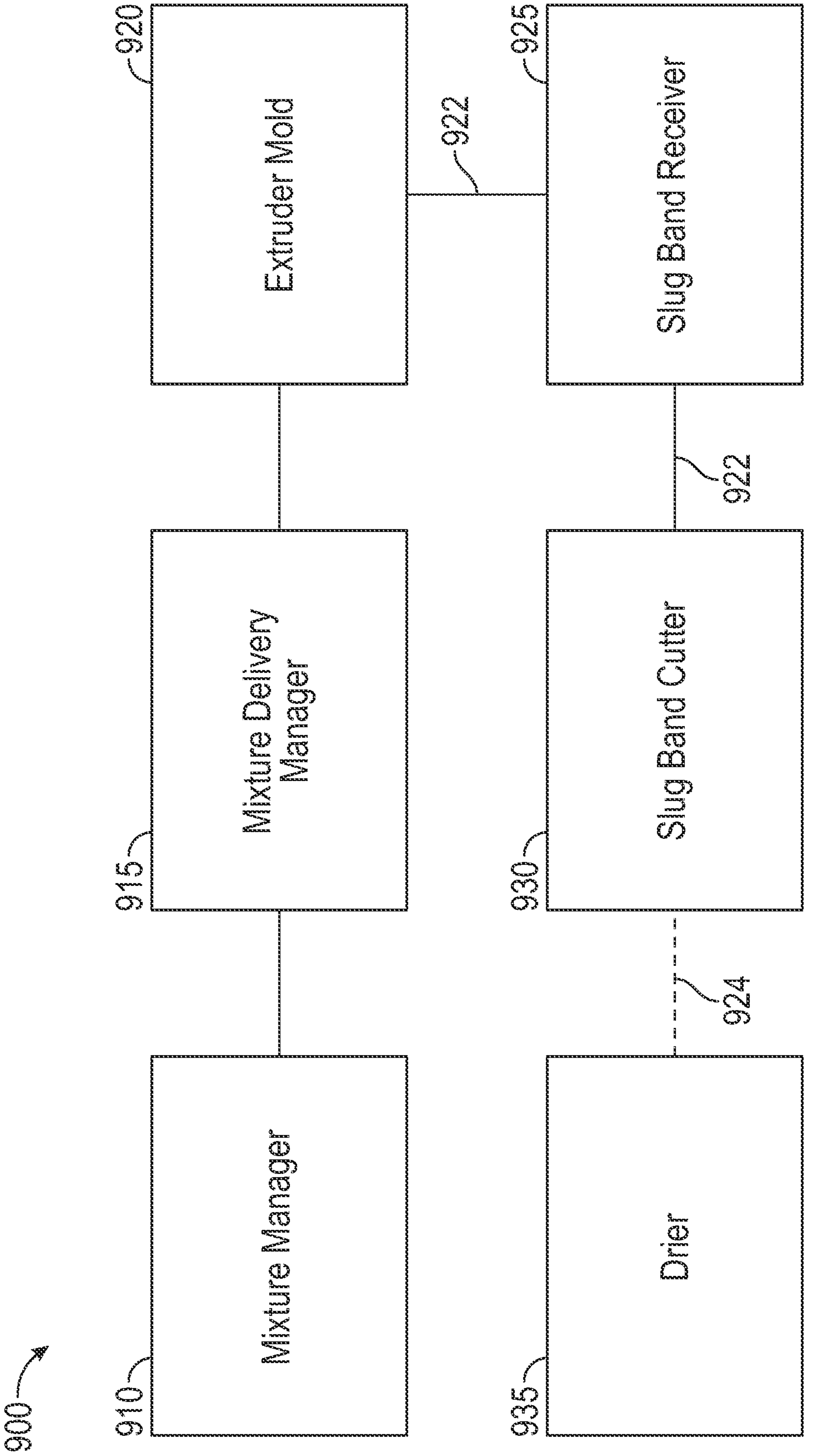
FIG. 9 illustrates a system for forming a polymer masonry unit in accordance with one or more exemplary embodiments of the present disclosure.

FIG. 9 illustrates a system 900 for forming a PMU in accordance with one or more exemplary embodiments of the present disclosure. In particular, system 900 may implement an extrusion method for forming PMUs. As noted above, traditional systems and techniques for making bricks are unable to make calcium carbonate-based (e.g., limestone-based) bricks using extrusion methods. System 900 is configured, along with the PMU composition, to enable the PMU mixture to be extruded from an extruder, enabling system 900 to make brick units or PMUs taking advantage of the extrusion method, which can be very efficient and cost-effective for making bricks. As shown in FIG. 9, system 900 may include mixture manager 910, mixture delivery manager 915, extruder mold 920, slug band receiver 925, slug band cutter 930, and drier 935.

In embodiments, system 900 may represent a system that is at least partially automated. For example, one or more components of system 900 may operate automatically to perform their respective function. In a particular embodiment, for example, ingredients for making the PMU mixture may be automatically loaded onto the mixer, the mixture (after being mixed) may be automatically delivered to the extruder mold 920 for extrusion, the slug band extruded from extruder mold 920 may be automatically fed into the slug band cutter 930 for cutting the slug band into individual PMUs, and/or the individual PMUs may be automatically directed into the drier for drying. In this manner, a portion (and in some embodiments a substantial portion) of the process implemented by system 900 may be automated.

Mixture manager 910 may be configured to control and/or manage the mixing process of the basic ingredients or materials for generating the PMU mixture that may be used to make the PMUs. In embodiments, the PMU mixture may include quarry byproducts (e.g., calcium carbonate aggregate, such as limestone), polymer, and water. In one embodiment, the PMU mixture may include the calcium carbonate-based aggregate (e.g., limestone), the polymer, and the water to the exclusion of other materials. For example, the calcium carbonate-based aggregate may be 100% calcium carbonate. In this case, the PMU mixture may include calcium carbonate, the polymer, and the water, and no other materials. In a particular embodiment, the PMU mixture may exclude sodium carbonate. As mentioned before, the presence of sodium carbonate in the PMU mixture may change the basic characteristics of the PMU mixture and/or the PMUs made from the PMU mixture. Particularly, sodium carbonate is considered to be a source of efflorescence, which makes it highly undesirable as a brick material, and sodium carbonate is water soluble, which reduces the strength of the PMUs when sodium carbonate is present in the PMU mixture.

In embodiments, controlling and/or managing the mixing process of the basic ingredients or materials for generating the PMU mixture may include determining the amount of quarry byproducts (e.g., rock base material), an amount of polymer, and an amount of water to be included in the PMU mixture. In one embodiment, the amounts of each quarry byproducts, polymer, and water to be included in the PMU mixture may be determined based on a batch size. The batch size may indicate the number of PMUs to be made from the PMU mixture, or may be based on an arbitrary amount of PMU mixture that is not related to a number of PMUs to be made. For example, a PMU unit size may be determined for a number of PMUs to be made. In this case, the PMU unit size and the number of PMUs of that PMU unit size to be made may be used to calculate the amount of PMU mixture required to make the number of PMUs of the PMU unit size. The determined amount of PMU mixture may then be used to calculate the amounts of each quarry byproducts, polymer, and water to be included in the PMU mixture.

In embodiments, calculating the amounts of each quarry byproducts, polymer, and water to be included in the PMU mixture may include determining the proportion of each ingredient to be included in the PMU mixture. The proportion of the PMU mixture composition (e.g., the amounts of each quarry byproducts, polymer, and water to be included in the PMU mixture) may be based on operational requirement, based on characteristics of the ingredients, etc.

For example, with respect to the amount of water to be included in the PMU mixture, the amount of water to be included in the PMU mixture may be based on a target moisture content of the PMU mixture. For example, a quarry byproduct material may have an optimal moisture content at which the quarry byproduct material will achieve a maximum dry density when compacted and dried. In this case, (as described with respect to FIG. 7) the target moisture content may be determined to be in any range or amount that may facilitate the compaction and sufficient dry density of the quarry byproduct material. In embodiments, the amount target moisture content of the PMU mixture may range from 1% to 10% of the wet mixture weight of the PMU mixture batch. In this manner, the amount of water to be included in the PMU mixture may be based on the target moisture content. In embodiments, the amount target moisture content of the PMU mixture may range from 1% to 10% of the wet mixture weight of the PMU mixture batch.

With respect to the amount of polymer to be included in the PMU mixture, the amount of polymer to be included in the PMU mixture may be based on a target polymer content for the PMU mixture. For example, a PMU mixture may have varying degrees of polymer as compared to the quarry byproducts material and/or water that may lend distinct properties to the PMU mixture. In one embodiment, including less polymer may lead to a more brittle PMU. In another embodiment, using more polymer may lead to a more malleable PMU. In one embodiment, a specific polymer content of a PMU mixture may provide optimal compression strength. In one embodiment, a target polymer content may be from 1-10% of a wet mixture weight (e.g., the weight of the PMU mixture when wet, such as before drying) of the PMU mixture. In another embodiment, a target polymer content may be less than 8%. In another embodiment, a target polymer content may be more than 2%. In this manner, the amount of polymer to be included in the PMU mixture may be based on the target polymer content.

With respect to the amount of quarry byproducts to be included in the PMU mixture, the amount of quarry byproducts to be included in the PMU mixture may be based on the size of the PMU mixture batch. In one embodiment, the quarry byproducts material may comprise the vast majority of the volume of the PMU mixture, such as because the amount of water and/or polymer is comparatively small, and/or because the water and/or polymer may fill in spaces between quarry byproducts material particles such that the water and/or polymer do not substantially affect a volume and/or size of a mixture of quarry byproducts material, water, and polymer. In embodiments, the amount of quarry byproducts to be included in the PMU mixture may range from 80% to 90% of the wet mixture weight of the PMU mixture.

In embodiments, the amount of water to be included in the PMU mixture may be determined based on the target moisture content of the PMU mixture and the amount of polymer. For example, the amount of polymer may be included in the moisture content consideration, such that the moisture content of the PMU mixture may include polymer that provides fluid that may be considered moisture. In another embodiment, an amount of polymer may comprise a portion of the moisture content, and an amount of water may comprise the remainder of the moisture content not accounted for by the polymer. For example, and in one embodiment, if a target moisture content is 10% by weight of the wet PMU mixture, and the amount of polymer in the PMU mixture is 3% by weight of the wet PMU mixture (which may, e.g., correspond to the target polymer content), 30% of the total moisture content may be accounted for by the polymer. In one embodiment, an amount of water may then be determined to be 7% by weight of the wet PMU mixture, such that the entire moisture content may be 10% of the wet PMU mixture. In another embodiment, the amount of water may be any amount necessary to add with the polymer to achieve the target moisture content.

In embodiments, mixture manager 910 may be configured to mix the ingredients (e.g., the quarry byproducts, the polymer, and the water) in the determined amounts (and/or proportions) to generate a PMU mixture (or slurry). In embodiments, mixture manager 910 may mix (e.g., in a mixer) the PMU mixture until the PMU mixture reaches a consistency of a paste that is suitable to be moved through the extruder mold 920. In embodiments, mixture manager 910 may provide the PMU mixture to mixture delivery manager 915.

Mixture delivery manager 915 may be configured to homogenize the PMU mixture, to optimize the PMU mixture for feeding into extruder mold 920, and to feed the PMU mixture to and through extruder mold 920. In embodiments, homogenizing the PMU mixture may include mixing the PMU mixture until it is substantially homogenous. Optimizing the PMU mixture for feeding into extruder mold 920 may include ensuring that the size (e.g., cross sectional area) of the PMU mixture as it is fed into extruder mold 920 is relatively uniform, constant, and has a feeding rate that is optimized for extruder mold 920. For example, too fast a feeding rate may overwhelm extruder mold 920 and may cause extruder mold 920 to bottleneck and bind, whereas too slow a feeding rate may result in an extrusion that is not compacted adequately and may fail.

In embodiments, mixture delivery manager 915 may include an auger (e.g., auger 320 of FIG. 3B) configured with a mechanism (e.g., blades, helical shaft, boring mechanism, etc.) that presses, pushes, moves, or otherwise delivers the PMU mixture (e.g., the homogenized PMU mixture) toward and against extruder mold 920 at the optimized feeding rate. In embodiments, mixture delivery manager 915 may include a vacuum that may be used to facilitate the feeding of the PMU mixture into and through extruder mold 920, such as by providing a vacuum force for moving the mixture at a uniform and/or constant feeding rate (e.g., the optimized feeding rate). In some embodiments, the vacuum may also facilitate compression of the PMU mixture, as well as removing air pockets form the PMU mixture.

Extruder mold 920 may be configured to extrude the PMU mixture as a slug band 922 sized and shaped in accordance with the configuration of one or more dies of extruder mold 920. In embodiments, extruder mold 920 may include functionality similar to functionality of extruder 350 of FIG. 3B. In embodiments, slug band 922 may represent the extruded form of the PMU mixture as formed by the one or more dies of extruder mold 920. For example, as mentioned above, as slug band 922 is extruded from extruder mold 920, the one or more dies of extruder mold 920 may impart a form or shape onto slug band 922. In embodiments, the shape of slug band 922 may be a rectangular form, in which case slug band 922 may be a rectangular band.

In embodiments, the one or more dies of extruder mold 920 may be configured with different shapes and may be interchangeable, such that a first die may impart a first shape onto slug band 922 when extruded from extruder mold 922 using the first die, and a second die may impart a second shape, different from the first shape, onto slug band 922 when extruded from extruder mold 920 using the second die. In this manner, extruder mold 920 may operate to extrude the PMU mixture as slug band 922 having a particular shape and size.

In embodiments, the dimensions of slug band 922 (e.g., the height, width, and length (where length is along the extrusion axis, such as along the direction along which slug band 922 is extruded)) may be determined based on operations requirements. For example, the height and width may be determined based on the size of the brick or PMU being manufactured. The dimensions of the brick may vary, and in this case, the height and width of slug band 922 may be obtained by extruder mold 920. For different dimensions for slug band 922, a different extruder mold 920 may be used. In embodiments, extruder mold 920 may include functionality to create one or more cores in slug band 922. A core may refer to a void, hole, or negative space within the interior of slug band 310.

Slug band receiver 925 may be configured to provide a surface onto which slug band 922 may be received as slug band 922 is extruded from extruder mold 920 and to route slug band 922 onto slug band cutter 930. In embodiments, slug band receiver may include a table, a conveyor or feeder belt, etc. that may include a receiving surface onto which slug band 922 may be extruded. In embodiments, the receiving surface of slug band receiver 925 may include a non-stick layer onto which slug band 922 may be extruded. In embodiments, the non-stick layer includes one or more of a layer of oil, a plastic layer, a pressurized air layer, a non-stick chemical, non-corrosive and waterproof layer, and/or any other type of layer that may allow slug band 922 to slide over the receiving surface without sticking to the receiving surface. The non-stick layer of slug band receiver may receive the extruded slug band 922 from extruder mold 920 and may allow slug band 922 to be moved over the surface while preventing slug band 922 from sticking to the receiving surface of slug band receiver 925. In this manner, slug band 922 may be extruded from extruder mold 920 without sticking to the receiving surface. Without the non-stick layer of the receiving surface of slug band receiver 925, slug band 922 may stick to the receiving surface causing the slug band 922 to break apart or deform due to the friction created and/or may prevent extruder mold 920 from being able to extrude the slug band 922 as extruder mold 920 may not have enough force to push slug band 922 along the extrusion.

Slug band cutter 930 may be configured to cut or slice slug band 922 into one or more individual PMUs 924. For example, slug band cutter 930 may cut slug band 922 along the cross-sectional axis (e.g., orthogonal to the extrusion axis) to form the one or more individual PMUs 924. The location at which slug band cutter 930 may slice or cut into slug band 922 may be based or may determine the size of the individual PMUs 924. For example, as noted above, the height and width of slug band 922 may be determined by the configuration (e.g., the one or more dies) of extruder mold 920. In this manner, two of the three dimension of the individual PMUs 924 may be determined by the dimensions of slug band 922. However, the length of slug band 922 may not be determined to be a specific length, as slug band 922 may be extruded from extruder mold 920 as a continuous band. In this case, the intervals at which the slug band 922 is cut may determine the third dimension (e.g., length) of the individually cut PMUs (e.g., individual PMUs 924). For example, a first configuration where slug band cutter 930 cuts into slug band 922 at a first interval may result in individual PMUs having a width and height equal to the width and height of slug band 922 but having a first length based on the first interval. In this example, a second configuration where slug band cutter 930 cuts into slug band 922 at a second interval different from the first interval may result in individual PMUs having a width and height equal to the width and height of slug band 922 but having a second length based on the second interval and different from the first length. In this manner, the length of the individual PMUs may be determined based on the interval at which slug band cutter 930 cuts into slug band 922.

In embodiments, the one or more individual PMUs 924 may be directed to drier 935. Drier 935 may be configured to allow the one or more individual PMUs 924 to dry into bricks. For example, the environment provided by drier 935 may allow the moisture in each of the one or more individual PMUs 924 to evaporate causing the one or more individual PMUs 924 to harden into bricks. In embodiments, drier 935 may include a drying room or space where the one or more individual PMUs 924 may dry.

In embodiments, drier 935 may provide an environment where the one or more individual PMUs 924 may be air dried, without a heat source, such as until the one or more individual PMUs 924 are substantially dry and/or solid. In other embodiments, drier 935 may include an oven or any other suitable heat source for facilitating the drying of the one or more individual PMUs 924.

FIGS. 10A-10D illustrate operations of a system for forming PMUs in accordance with one or more exemplary embodiments of the present disclosure. In embodiments, the operations illustrated in FIGS. 10A-10D may be performed using functionality as described with respect to FIGS. 8, 9, and 10. In particular, the operations illustrated in FIGS. 10A-10D may be performed to form PMUs using an extrusion method.

The operations for forming PMUs using an extrusion method may include mixing together a rock base material (e.g., a calcium carbonate aggregate, such as limestone), a polymer, and water to form a PMU mixture. In embodiments, the proportions of each ingredient that may be included in the PMU mixture may be obtained in accordance with the description with respect to FIGS. 8 and 9. In embodiments, the PMU mixture may be mixed in the determined amounts (and/or proportions) until the PMU mixture reaches a consistency of a paste that is suitable to be moved through an extruder, such as extruder 1050.

Figure 10A:
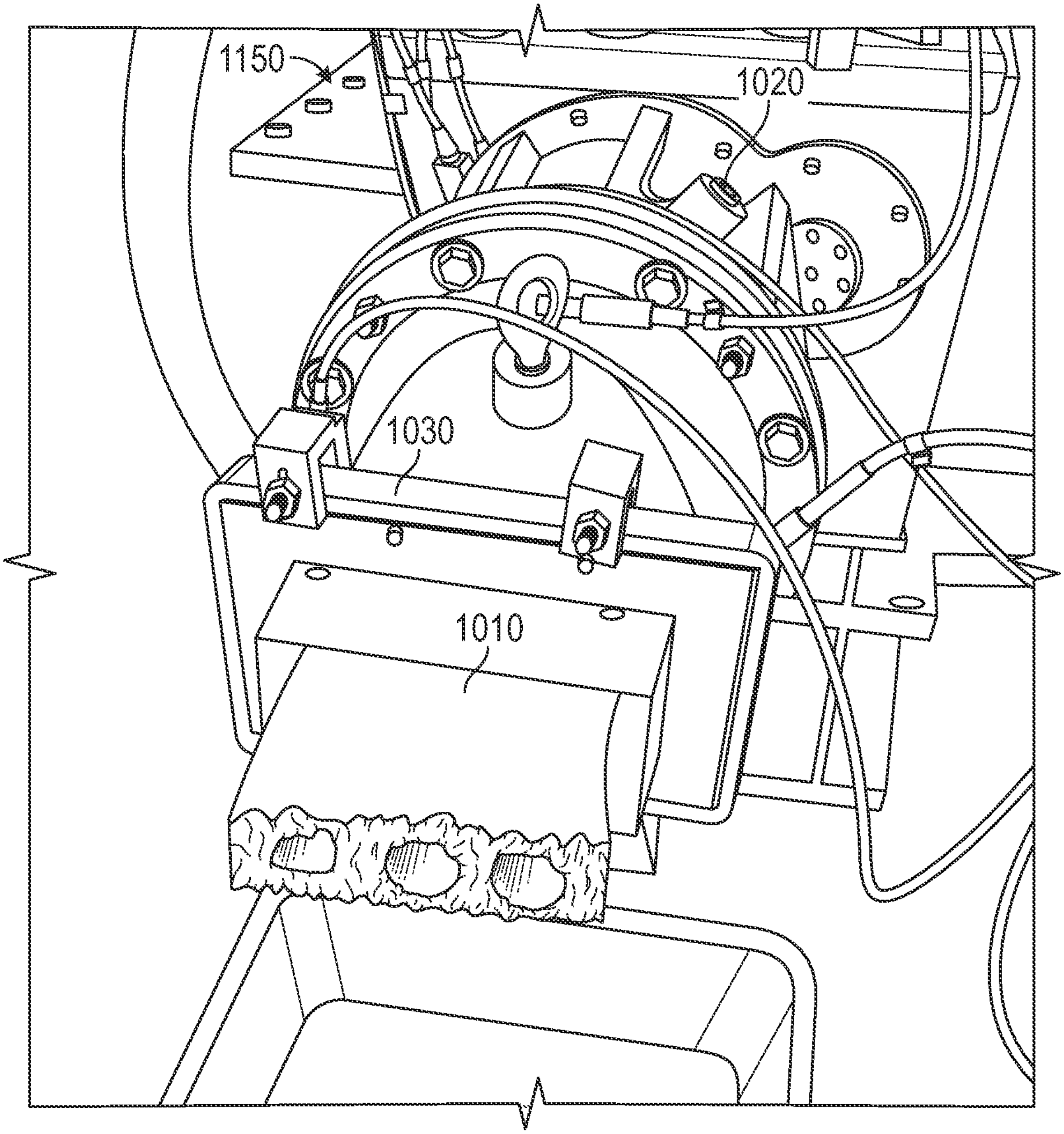
FIGS. 10A-10D illustrate operations of a system for forming a polymer masonry unit in accordance with one or more exemplary embodiments of the present disclosure.

As shown in FIG. 10A, the PMU mixture may be provided to auger 1020, and auger 1020 may feed the mixture to extruder mold 1030. In embodiments, auger 1020 may be configured with a mechanism (e.g., blades, helical shaft, boring mechanism, etc.) that presses, pushes, or otherwise moves the mixture toward and against extruder mold 1030 at an optimized feeding rate.

During operations, the PMU mixture provided to extruder mold 1030 by auger 1020 may be extruded from extruder mold 1030 as slug band 1010. For example, extruder mold 1030 may include one or more dies that may be configured to receive the PMU mixture from auger 1020 and to output slug band 1010. During operations, as slug band 1010 is extruded from extruder mold 1030, extruder mold 1030 may impart a form or shape onto slug band 1010. In this example, slug band 310 may be extruded as a rectangular band. In embodiments, a different extruder mold (e.g., a different die for extruder mold 1030) may be used to extrude slug band 1010 with a different shape from a rectangular shape.

Figure 10B:
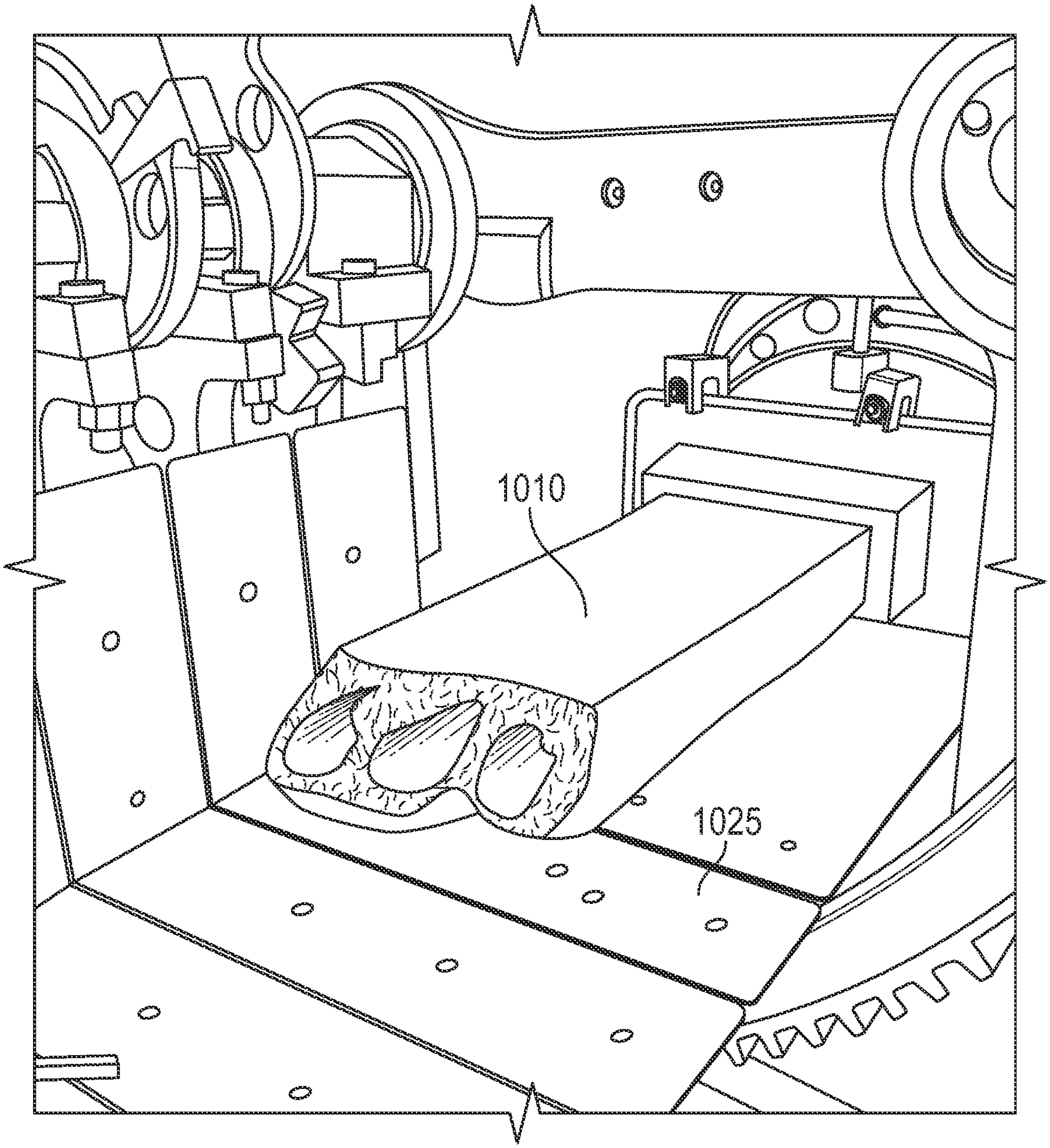

As shown in FIG. 10B, during operation, slug band 1010 may be received by slug band receiver 1025. In particular, slug band 1010 may be extruded onto a receiving surface of slug band receiver 1025. In embodiments, the receiving surface of slug band receiver 1025 may include a non-stick layer onto which slug band 1010 may be extruded, and which may allow or enable slug band 1010 to slide over the receiving surface without sticking to the receiving surface. In this manner, slug band receiver 1025 may allow slug band 1010 to be moved over the receiving surface while preventing slug band 1010 from sticking to the receiving surface of slug band receiver 1025.

Figure 10C:
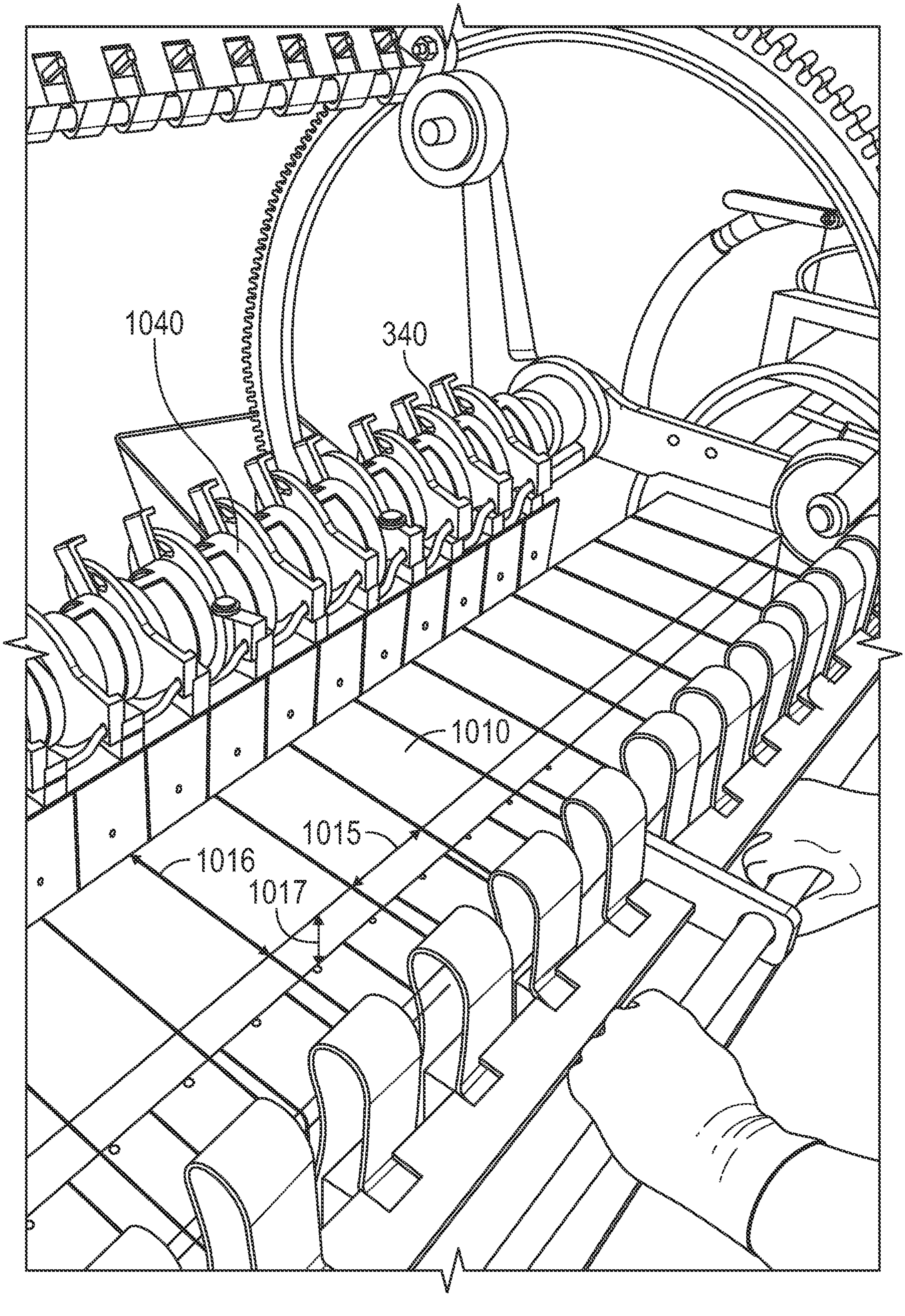
Figure 10D:
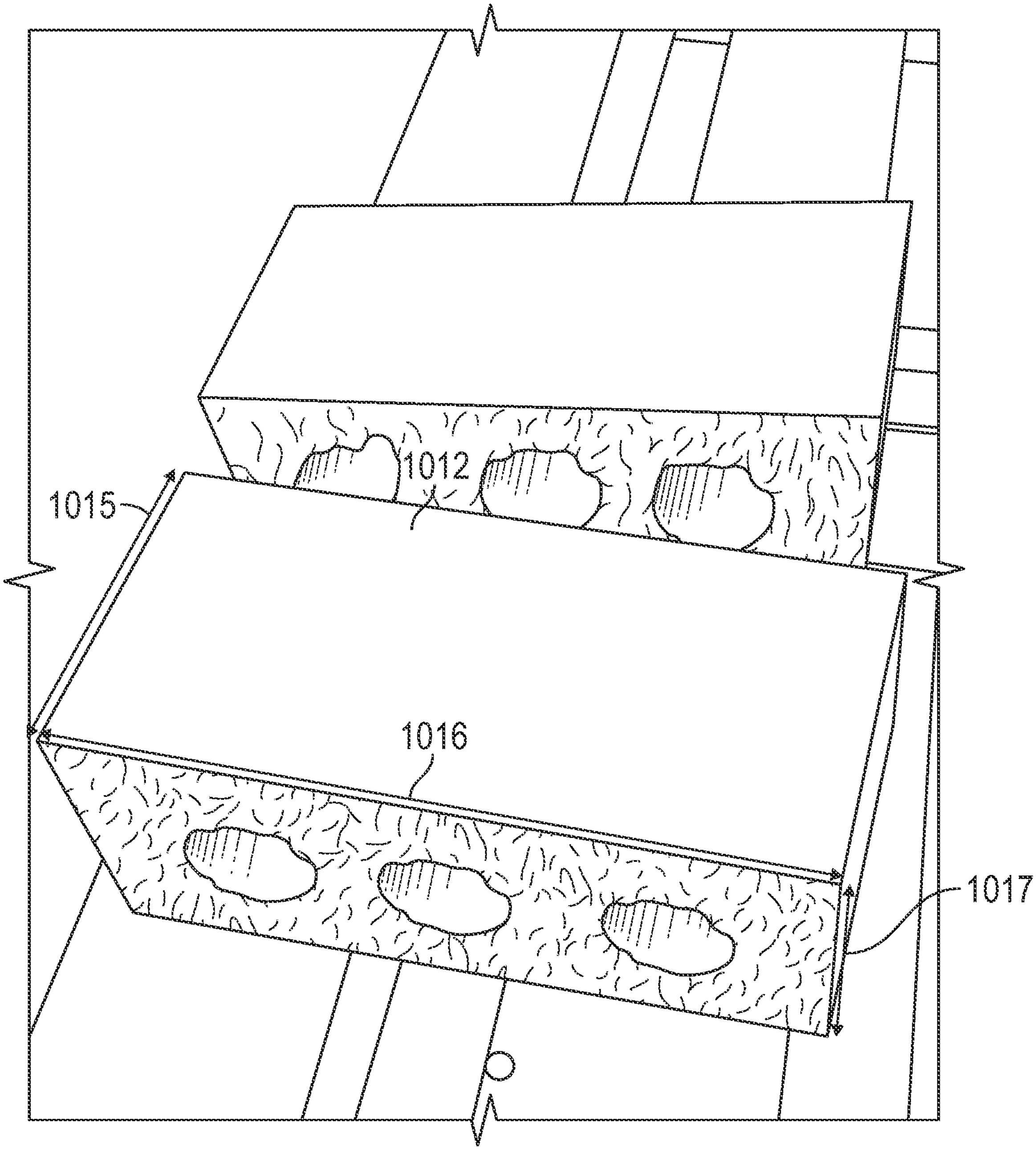

As shown in FIG. 10C, during operation, slug band 1010 may be cut into individual brick units or PMUs. For example, slug band cutter 1040 may be configured to cut slug band 1010 into individual PMUs. In some embodiments, slug band cutter 1040 may include a wire cutter, a blade, or any other mechanism for cutting or slicing the PMU mixture extruded as slug band 1010. In embodiments, slug band cutter 1040 may be configured to cut slug band 1010 along the cross-sectional axis (e.g., orthogonal to the extrusion axis) to form the individual brick units or PMUs. The size of each individual PMU may be determined based on the location at which slug band cutter 1040 cuts into slug band 1010. The height and width of slug band 1010 may be determined by the configuration (e.g., the one or more dies) of extruder mold 1030. In this manner, two of the three dimension of the individual PMUs may be determined by the dimensions of slug band 1010. For example, the width 1016 of the individual PMUs may be determined by the width of slug band 1010, and the height 1017 of the individual PMUs may be determined by the height of slug band 1010. However, the length of slug band 1010 may not be determined to be a specific length, as slug band 1010 may be extruded from extruder mold 1030 as a continuous band. In this case, the length 1015 of the individual PMUs may be determined by the location at which slug band cutter 1040 may cut into slug band 1010 to split or divide slug band 1010 into individual PMUs for example, by cutting into slug band 1010 at intervals of length 1015, the individual PMUs cut by slug band cutter 1040 may have a width 1016, a height 1017, and a length 1015 equal to the intervals at which slug band cutter 1040 cuts into slug band 1010. FIG. 10D illustrates an individual PMU 1012 with dimensions based on the example above. In embodiments, a shorter interval for cutting into slug band 1010 by slug band cutter 1040 may result in an individual PMU having a shorter length 1015, and a longer interval for cutting into slug band 1010 by slug band cutter 1040 may result in an individual PMU having a longer length 1015.

During operation, after slug band 1010 is cut into one or more individual PMUs, the one or more individual PMUs may be directed to a drier (e.g., a drying room) to dry. Upon drying, the one or more individual PMUs may harden into bricks. In embodiments, the one or more individual PMUs may be air dried, without a heat source, such as until the one or more individual PMUs are substantially dry and/or solid. In other embodiments, the one or more individual PMUs may be dried using an oven or any other suitable heat source for facilitating the drying of the one or more individual PMUs.

Figure 11:
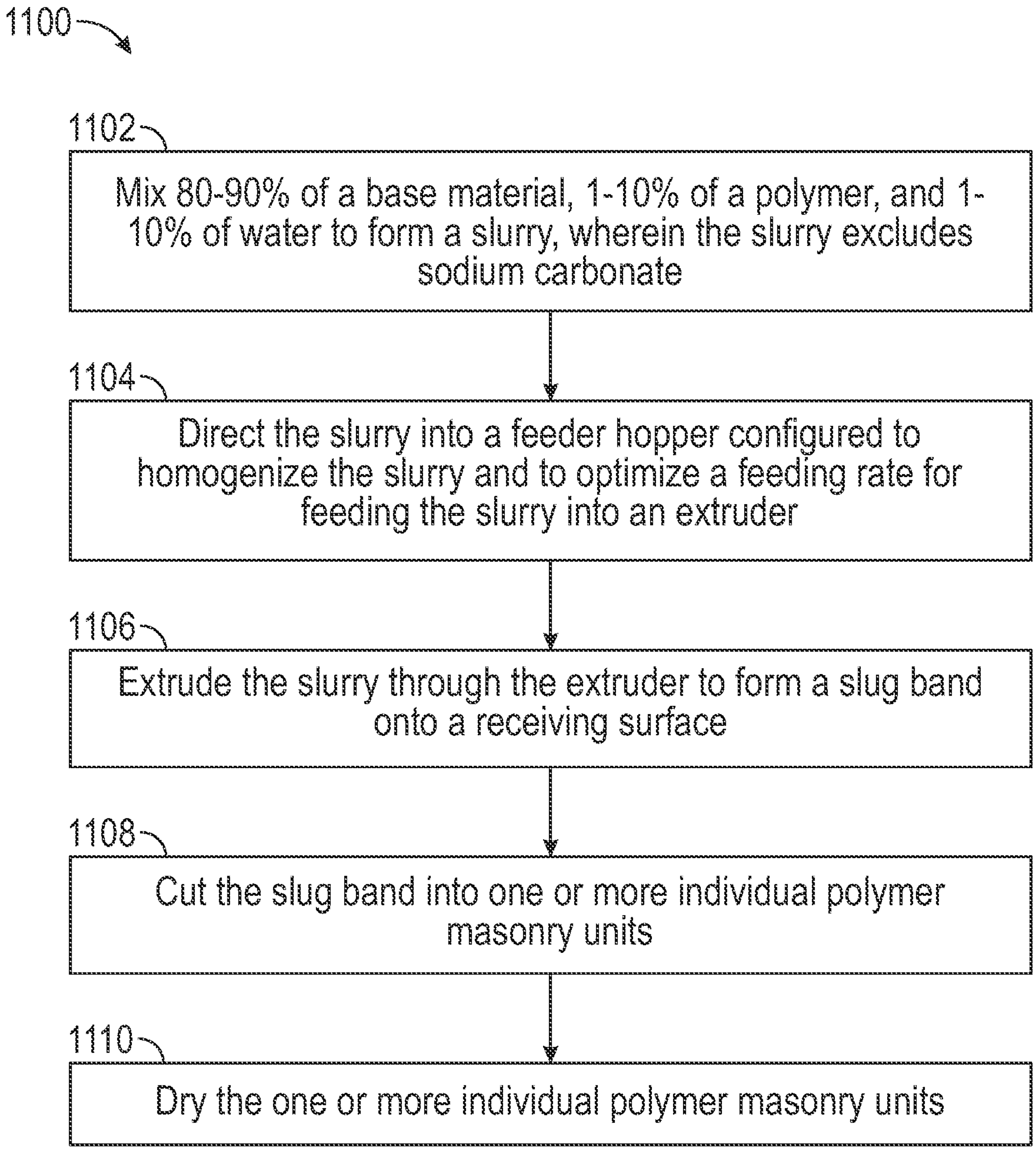
FIG. 11 illustrates yet another exemplary method of forming a polymer masonry unit in accordance with one or more exemplary embodiments of the present disclosure.

FIG. 11 depicts yet another embodiment of the present disclosure. A method of forming a polymer masonry unit 1100 may begin at step 1102, where 80-90% of a base material, 1-10% of a polymer, and 1-10% of water are mixed together to form a slurry according to configuration and functionality described with respect to embodiments of the present disclosure. In embodiments, the base material may be a calcium carbonate aggregate, such as a limestone material generated as a quarry byproduct. In embodiments, the slurry may exclude sodium carbonate. In embodiments, the slurry may be mixed until it is substantially homogenous and reaches a consistency of a paste that is suitable to be moved through an extruder. In embodiments, the polymer may be a styrene-butadiene-based polymer.

At step 1104, the slurry is directed into a feeder hopper (e.g., mixture delivery manager 915 of FIG. 9) configured to homogenize the slurry and to optimize a feeding rate for feeding the slurry into an extruder according to configuration and functionality described with respect to embodiments of the present disclosure. In embodiments, homogenizing the slurry may include mixing the slurry until it is substantially homogenous. Optimizing the feeding rate of the slurry may include ensuring that the size (e.g., cross sectional area) of the slurry as it is fed into the extruder is relatively uniform, constant, and has a feeding rate that is optimized for the extruder. For example, too fast a feeding rate may overwhelm the extruder and may cause the extruder to bottleneck and bind, whereas too slow a feeding rate may result in an extrusion that is not compacted adequately and may fail.

At step 1106, the slurry is extruded through the extruder to form a slug band onto a receiving surface. For example, the slurry may be extruded from an extruder (e.g., extruder mold 920 of FIG. 9 and/or extruder 1150 of FIG. 10A) as a slug band according to configuration and functionality described with respect to embodiments of the present disclosure. For example, the extruder may include an extruder mold that may be configured to impart a form or shape onto the slug band. In embodiments, the slug band may be extruded from the extruder at a particular extrusion rate. In embodiments, the extruder may be configured with one or more cores configured to create a respective void within the slug band. In embodiments, lubrication may be provided to the extruder to prevent tearing of the slug band.

In embodiments, the slug band may be received by a slug band receiver (e.g., slug band receiver 925 of FIG. 9 and slug band receiver 1025 of FIG. 10B) that may include the receiving surface according to configuration and functionality described with respect to embodiments of the present disclosure. The receiving surface may include a non-stick layer configured to receive the extruded slug band from the extruder and to prevent the slug band from sticking to the receiving surface. In embodiments, the non-stick layer may include one or more of a layer of oil, a plastic layer, a pressurized air layer, a non-stick chemical, non-corrosive and waterproof layer, and/or any other type of layer that may allow the slug band to slide over the receiving surface without sticking to the receiving surface.

At step 1108, the slug band is cut into one or more individual polymer masonry units. For example, a slug band cutter (e.g., slug band cutter 930 of FIG. 9 and slug band cutter 1040 of FIG. 10C) may be used to cut the slug band into one or more individual polymer masonry units according to configuration and functionality described with respect to embodiments of the present disclosure. In embodiments, the slug band may be cut cross-sectionally at particular locations along the length of the slug band to form the individual polymer masonry units.

At step 1110, the one or more individual polymer masonry units are dried. For example, a drier (e.g., drier 935 of FIG. 9) many be used to dry the one or more individual polymer masonry units according to configuration and functionality described with respect to embodiments of the present disclosure. In embodiments, drying the one or more individual polymer masonry units may include directing the one or more individual polymer masonry units into a temperature-controlled drying room. In embodiments, the temperature-controlled drying room may provide ambient drying and may be configured to dry the one or more individual polymer masonry units without using a heat source.

It will be understood by those having skill in the art that several methods are available to determine characteristics of given rock base material in accordance with the principles of the present disclosure. For example, a sieve analysis test can be used to determine a particle size distribution of a quarry byproduct. In another example, a Proctor compaction test can be used to determine an optimal moisture content (which can guide, e.g., a target moisture content) at which a given aggregate will become most dense and achieve its maximum dry density. In another embodiment, an Atterberg test can be utilized to determine liquid limits, plastic limits, plasticity indices, or any other suitable indices, measurements, or constants related to critical water contents of, e.g., a quarry byproduct.

In another embodiment, polymer masonry units in accordance with the principles of the present disclosure can withstand compression. For example, a unit can withstand, in one embodiment, up to 4000 PSI. In another embodiment, a polymer masonry unit in accordance with the principles of the present disclosure can withstand any amount of compression necessary to allow the unit to pass, for example, ASTM standards with respect to compression strength.

Persons skilled in the art will readily understand that the advantages and objectives disclosed herein would not be possible without the particular combination of structural components and mechanisms assembled in this inventive system and described above.

The present disclosure achieves at least the following advantages:

1. New use for quarry byproduct;
2. Construction unit whose manufacture is environmentally friendly;
3. Manufacturing method including extrusion process;
4. Brick unit that does not require a kiln to cure; and
5. Recycles quarry byproduct into a construction unit capable of replacing traditional bricks.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

Moreover, the description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). Even under the broadest reasonable interpretation, in light of this paragraph of this specification, the claims are not intended to invoke 35 U.S.C. § 112(f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the disclosures can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

While the disclosure has described a number of embodiments, it is not thus limited and is susceptible to various changes and modifications without departing from the spirit thereof. Persons skilled in the art will understand that this concept is susceptible to various changes and modifications, and may be implemented or adapted readily to other types of environments. Further, the individual elements of the claims are not well-understood, routine, or conventional. Instead, the claims are directed to the unconventional inventive concept described in the specification.

What is claimed is:

1. A method of forming a polymer masonry unit, comprising:

mixing together a calcium carbonate aggregate, a polymer, and water to form a mixture having a wet mixture weight, wherein an amount of the water to be mixed is determined based on a target moisture content for the mixture;

extruding the mixture through an extruder mold to form one or more polymer masonry units; and drying the one or more polymer masonry units, wherein the polymer comprises 1-10% of the wet mixture weight, wherein the rock base material is a calcium carbonate aggregate; and wherein 5-15% by weight of the calcium carbonate aggregate comprises particles of 4750 microns and larger.

2. The method of claim 1, wherein the mixture excludes sodium carbonate.

3. The method of claim 1, wherein the polymer is a styrene-butadiene-based polymer.

4. The method of claim 1, wherein extruding the mixture through the extruder mold to form one or more polymer masonry units includes:

extruding the mixture through the extruder mold to form a slug band onto a receiving surface; and cutting the slug band into the one or more polymer masonry units.

5. The method of claim 4, wherein the receiving surface includes a non-stick layer to receive the extruded slug band from the extruder and to prevent the slug band from sticking to the receiving surface.

6. The method of claim 4, wherein the extruder mold is configured to impart a form to the slug band.

7. The method of claim 6, wherein the extruder mold is configured with one or more cores configured to create a respective void within each of the one or more polymer masonry units.

8. The method of claim 1, further comprising:

providing lubrication to the extruder mold to prevent tearing of the slug band.

9. The method of claim 1, wherein drying the one or more polymer masonry units includes:

directing the one or more polymer masonry units into a temperature-controlled drying room, wherein the temperature-controlled drying room provides ambient drying and is configured to dry the one or more polymer masonry units without using a heat source.

10. A method of forming a polymer masonry unit, comprising:

mixing 80-90% of a base material, 1-10% of a polymer, and 1-10% of water to form a slurry, wherein the slurry excludes sodium carbonate and wherein 5-15% by weight of the base material comprises particles of 4750 microns and larger;

directing the slurry into a feeder hopper configured to homogenize the slurry and to optimize a feeding rate for feeding the slurry into an extruder;

extruding the slurry through the extruder to form a slug band onto a receiving surface;

cutting the slug band into one or more individual polymer masonry units; and drying the one or more individual polymer masonry units.

11. The method of claim 10, wherein the base material is a calcium carbonate aggregate.

12. The method of claim 11, wherein the calcium carbonate aggregate is limestone generated as a quarry byproduct.

13. The method of claim 10, wherein the receiving surface includes a non-stick layer to receive the extruded slug band from the extruder and to prevent the slug band from sticking to the receiving surface.

14. The method of claim 13, wherein the non-stick layer includes one or more of:

a layer of oil;

a plastic layer;

a pressurized air layer;

a non-stick chemical, non-corrosive and waterproof layer.

15. The method of claim 10, wherein the extruder includes a mold through which the slurry is extruded, the mold configured to impart a form to the slug band.

16. The method of claim 15, wherein the mold is configured with one or more cores configured to create a respective void within each of the one or more individual polymer masonry units.

17. The method of claim 10, further comprising:

providing lubrication to the extruder to prevent tearing of the slug band.

18. The method of claim 10, wherein drying the one or more individual polymer masonry units includes:

directing the one or more individual polymer masonry units into a temperature-controlled drying room, wherein the temperature-controlled drying room provides ambient drying and is configured to dry the one or more individual polymer masonry units without using a heat source.

19. The method of claim 10, wherein the polymer is a styrene- butadiene-based polymer.

* * * * *